United States Patent
Karalis et al.

(10) Patent No.: US 10,125,046 B2
(45) Date of Patent: Nov. 13, 2018

(54) EXPANDED, MICRONIZED SURFACE TREATED ALUMINOSILICATE VOLCANIC GLASS AS LAMELLAR FUNCTIONAL FILLER FOR PLASTICS AND SPECIAL COATINGS

(71) Applicants: S&B INDUSTRIAL MINERALS S.A., Kifissia, Attiki (GR); Athanasios Karalis, Attiki (GR); Ioannis Poulakis, St Simons Island, GA (US); Salvatore Peter Larosa, Peru, NY (US); Christina Kapralou, Nea Makri (GR); Gary Charles Phillips, Allen Park, MI (US); Nils Rickertsen, Olfen (DE); Christos Dedeloudis, Nea Smyrni (GR); Doukas Efstathiadis, Acharnes Attikis (GR)

(72) Inventors: Athanasios Karalis, Attiki (GR); Ioannis Poulakis, St. Simons Island, GA (US); Salvatore Peter Larosa, Peru, NY (US); Christina Kapralou, Nea Makri (GR); Gary Charles Phillips, Allen Park, MI (US); Nils Rickertsen, Olfen (DE); Christos Dedeloudis, Nea Smyrni (GR); Doukas Efstathiadis, Acharnes Attikis (GR)

(73) Assignee: S & B Industrial Minerals S.A., Kifissia, Attiki (GR)

( * ) Notice: Subject to any disclaimer, the term of this patent is extended or adjusted under 35 U.S.C. 154(b) by 44 days.

(21) Appl. No.: 15/029,183

(22) PCT Filed: Oct. 15, 2014

(86) PCT No.: PCT/US2014/060775
§ 371 (c)(1),
(2) Date: Apr. 13, 2016

(87) PCT Pub. No.: WO2015/057895
PCT Pub. Date: Apr. 23, 2015

(65) Prior Publication Data
US 2016/0257609 A1   Sep. 8, 2016

Related U.S. Application Data

(60) Provisional application No. 61/891,192, filed on Oct. 15, 2013, provisional application No. 61/891,873, filed on Oct. 16, 2013.

(51) Int. Cl.
*C03C 11/00* (2006.01)
*C09D 163/00* (2006.01)
(Continued)

(52) U.S. Cl.
CPC ............... *C03C 11/00* (2013.01); *C03C 12/00* (2013.01); *C03C 17/28* (2013.01); *C08K 9/04* (2013.01);
(Continued)

(58) Field of Classification Search
None
See application file for complete search history.

(56) References Cited

U.S. PATENT DOCUMENTS 2,625,512 A * 1/1953 Powell .................. C04B 18/027
106/122
3,382,170 A  5/1968 Pape
(Continued)

FOREIGN PATENT DOCUMENTS

WO    WO 2008/053236 A1   5/2008
WO    WO 2012/056256 A1   5/2012

OTHER PUBLICATIONS

International Search Report and Written Opinion dated Feb. 25, 2015, in International Application No. PCT/US2014/060775 (9 pgs.).

(Continued)

US 10,125,046 B2

Page 2

*Primary Examiner* — Joseph D Anthony
(74) *Attorney, Agent, or Firm* — Finnegan, Henderson Farabow, Garrett & Dunner, LLP

(57) ABSTRACT

The present disclosure relates to a composition comprising an expanded and micronized volcanic glass (EMVG) and at least one chemical agent, wherein the at least one chemical agent is coated on the surface of the volcanic glass. The present disclosure also relates to an improved process to remove mineral impurities and to coat the surface of the EMVG. The disclosed composition can be used a functional reinforcing filler to improve the mechanical properties of plastic.

15 Claims, 12 Drawing Sheets

(51) Int. Cl.
*C09D 5/08* (2006.01)
*C08L 23/14* (2006.01)
*C08K 9/06* (2006.01)
*C08K 9/04* (2006.01)
*C03C 12/00* (2006.01)
*C03C 17/28* (2006.01)
*C09D 5/03* (2006.01)
*C09D 7/62* (2018.01)

(52) U.S. Cl.
CPC .............. *C08K 9/06* (2013.01); *C08L 23/14* (2013.01); *C09D 5/033* (2013.01); *C09D 5/084* (2013.01); *C09D 7/62* (2018.01); *C09D 163/00* (2013.01)

(56) References Cited

U.S. PATENT DOCUMENTS

| | | | |
|---|---|---|---|
| 3,769,065 A | 10/1973 | Dunn | |
| 3,952,830 A | 4/1976 | Oshida et al. | |
| 4,183,980 A | 1/1980 | Nielsen | |
| 4,212,755 A * | 7/1980 | Ruff | C04B 20/1033 252/62 |
| 5,516,551 A | 5/1996 | Anderson et al. | |
| 5,964,934 A | 10/1999 | Englert | |
| 7,381,261 B1 | 6/2008 | Nelson | |
| 8,585,818 B1 * | 11/2013 | Jones | C09C 1/0015 106/31.9 |
| 2006/0042515 A1 * | 3/2006 | Bodycomb | C04B 18/02 106/698 |
| 2006/0075930 A1 | 4/2006 | Wang et al. | |
| 2008/0128661 A1 * | 6/2008 | Phillips | C08J 5/044 252/502 |
| 2010/0317789 A1 * | 12/2010 | Greene | C08K 7/26 524/494 |
| 2011/0040007 A1 * | 2/2011 | Chandrasekhar | H01B 1/22 524/404 |
| 2011/0269845 A1 * | 11/2011 | Bujard | C09C 1/0015 514/770 |
| 2012/0326072 A1 * | 12/2012 | Baek | C04B 14/185 252/62 |
| 2013/0143044 A1 * | 6/2013 | Roos | C04B 14/16 428/405 |

OTHER PUBLICATIONS

Supplementary European Search Report dated May 2, 2017, in corresponding EP Application No. 14853636.0 (10 pgs.).
D. Herskovitch et al., "Upgrading of Raw Perlite by a Dry Magnetic Technique", Magnetic and Electrical Separation, vol. 7, No. 3, Jan. 1, 1996, pp. 145-161, XP055365671.

* cited by examiner (a) (b)

EMVG – 3100 Hours Salt Fog Exposure
(B1000 – Epoxy/DICY System)

EXPANDED, MICRONIZED SURFACE TREATED ALUMINOSILICATE VOLCANIC GLASS AS LAMELLAR FUNCTIONAL FILLER FOR PLASTICS AND SPECIAL COATINGS

CLAIM FOR PRIORITY

This application is a U.S. national phase entry under 35 U.S.C. § 371 from PCT International Application No. PCT/US2014/060775, filed Oct. 15, 2014, which claims the benefit of priority of U.S. Patent Application No. 61/891,192, filed Oct. 15, 2013 and U.S. Patent Application No. 61/891,873, filed Oct. 16, 2013, the subject matter of both of which is incorporated herein by reference.

FIELD OF THE INVENTION

This invention relates to a series of improved engineering fillers based on micronized expanded volcanic glass like natural pitchstone, natural or expanded pumicite, and expanded perlite for use as reinforcing agent and functional additive in several polymer compounds (e.g., polyolefin and polyamide based plastics) and other applications.

BACKGROUND

Worldwide more than 50 million tons of fillers for different application areas, such as paper, plastics, rubber, paints and adhesives, are consumed annually. Fillers are substances that are used predominantly to cheapen end products. However, there are special fillers that are also able to enhance mechanical or optical properties of the end products and these are called functional fillers or functional additives.

Thermoplastics and thermosets are traditionally the most important application market, accounting for 26% of the total inorganic filler market demand. The presence and/or arrangement of the filler particles within the matrix can even affect intrinsic properties of the matrix, e.g., crystallinity (nucleation) and glass transition temperature (hindered conformal molecular motion). However, in most cases, formulators are seeking improvement in mechanical and thermal properties.

BRIEF SUMMARY OF THE INVENTION

This invention provides uncoated and surface coated beneficiated micronized expanded volcanic glass functional fillers (referred to as EMVG and c-EMVG), which can be used alone or in mixtures as reinforcing and functional additives in polyolefins, engineering alloys and blends and in epoxy powder coating systems. The disclosed functional fillers improve the physical properties of the polymer materials, such as mechanical and thermal properties, malodor, anti-corrosion resistance and can partially or fully substitute currently used functional fillers such as talc, calcined kaolin and glass fibers. The invention also provides two novel surface modification processes for the surface treatment of the said or other functional fillers prior to compounding, with various chemical agents which are acting either as non-reactive wetting silanated agents, reactive coupling substances, some other type of surface treatment, or a combination thereof described herein.

In certain embodiments, a composition comprising an expanded and micronized volcanic glass (EMVG) and at least one chemical agent, wherein the at least one chemical agent is coated on the surface of the EMVG. In another embodiment, at least two chemical agents coated on the surface of the EMVG. In certain embodiments, the at least one chemical agent is a non-reactive wetting silanated agent or a reactive coupling agent. In other embodiments, the at least one chemical agent is selected from the group consisting of a polymer, a wax, an emulsion, an organo-based silane, and combinations of any thereof. In one embodiment, the polymer is a polypropylene grafted maleic anhydride. In other embodiments, the polypropylene grafted maleic anhydride is a maleic anhydride functionalized polypropylene. In certain embodiments, the polymer is a mixture of polydimethylsiloxane (PDMS) and polymethylhydrosiloxane groups. In other embodiments, the polymer is a mixture of dimethyl siloxane, dimethylvinyl-terminated and dimethyl, methylhydrogen siloxane.

In certain embodiments, the surface treatment on c-EMVG can be a combination of polydimethylsiloxane and aminopropyltriethoxysilane. In other embodiments, the emulsion is a water based emulsion. In further embodiments, the emulsion is an organomodified polysiloxane, PP polymer, or urethane polymer. In still further embodiments, the organo based silane has the generic structure such as R—(CH2)n-Si—X3 where R is a non-hydrolyzable organic moiety that can be either an alkyl, aromatic, organofunctional, or a combination of any of these groups and X represents alkoxy moieties, most typically methoxy or ethoxy. In certain embodiments, the alkyl group is polyalkyleneoxidealkoxysilane. In other embodiments, the alkyl group is polyethyleneglycolalkoxysilane. In further embodiments, the aromatic group is phenyltrimethoxysilane. In still further embodiments, the organofunctional group is an amino (3-aminopropyltriethoxysilane), epoxy (3-glycidoxypropyltrimehtoxysilane), organosilane ester (vinyltriethoxysilane), methacryl (3-methacryloxypropyltrimethoxysilane), halo-alkyl (3-chloropropyltrimethoxysilane) or some other group that can react into the organic resin. In some embodiments, the organofunctional group has more than one functional group. In other embodiments, the multiple organofunctional group is amino or some other functional group. In still other embodiments, the multiple organofunctional group can be 3-(2-aminoethylamino)propyltrimethoxysilane.

In some embodiments, the chemical agent in the form of emulsion, polymer, wax or organo based silane is in an amount ranging from 0 to 10%, more preferably from 0.1 to 5% and most preferably from 0.25 to 4% by weight of the EMVG or other mineral or synthetic filler or functional additive.

In some embodiments, the composition includes up to 10% chemical agent by weight of EMVG. In other embodiments, the composition includes from 0.25% to 4% chemical agent by weight of EMVG. In still further embodiments, the EMVG is selected from the group consisting of a perlite, a pitchstone, a pumicite, and combinations of any thereof. In further embodiments, the EMVG contains less than 5% mineral impurities. In still further embodiments, the EMVG is substantially free of mineral impurities. In some embodiments, the mineral impurities comprise an impurity selected from the group consisting of ferromagnetic matter, crystalline silica, cristobalite, mica, feldspars, and combinations of any thereof.

In one embodiment, EMVG is made by a method of expanding volcanic glass, and milling the expanded volcanic glass. In other embodiments, the method further includes removing ferromagnetic matter from the milled volcanic glass. In still other embodiments, the method includes removing other mineral impurities. I certain embodiments, the method includes a system of a mill and an adjacent de-gritter, wherein the de-gritter is capable of removing mineral impurities from expanded and micronized volcanic glasses.

One embodiment includes a method of producing c-EMVG including expanding volcanic glass, milling the expanded volcanic glass to create EMVG, and coating the EMVG with at least one chemical agent. In certain embodiments, the coating includes a dry surface coating, including evaporating the coating agent, and depositing the evaporated coating agent onto the surface of the EMVG. In some embodiments, the depositing creates multiple covalent chemical bonds. In other embodiments, the multiple covalent chemical bonds comprise hydrogen bonds between the coating agent's silane group and a silanol group of the EMVG. In further embodiments, the multiple covalent chemical bonds comprise direct bonding between an oxygen of the coating agent's silane and a silicon atom of the silanol group of the EMVG. In certain embodiments, the method further includes heating the chemical agent to a temperature between 250-300° C. for 1-4 hours before coating. In other embodiments, the EMVG is selected from the group consisting of a perlite, a pitchstone, a pumicite, and combinations of any thereof.

In some embodiments, other minerals, synthetic fillers and functional additives chosen from the group consisting of magnesium oxysulfate fibers, calcium metasilicate, high aspect ratio wollastonite fibers, mica, muscovite type mica, glass, chopped or milled glass particles, and combinations of any thereof can also be surface treated.

One embodiment includes a composition comprising c-EMVG and a material selected from the group consisting of a polyolefin, an engineering plastic, and a coating. In some embodiments, the polyolefin comprises polypropylene. In other embodiments, the engineering plastic is selected from the group consisting of nylon 6, nylon 66, PC/ABS, PET/PBT, LCP, PC/ABS, LCP PET/PBT, PPE-PA, and combinations of any thereof. In further embodiments, the coating comprises a powder coating.

Certain embodiments include a method of improving mechanical properties of a plastic by using EMVG, c-EMVG or a combination thereof in the plastic. In some embodiments, EMVG, c-EMVG or a combination thereof or a combination thereof with other minerals or synthetic fillers are added to the plastic. One embodiment includes a method of improving mechanical properties of a plastic comprising applying EMVG, c-EMVG or a combination thereof or a combination thereof with other minerals, synthetic fillers and functional additives to the plastic. In certain embodiments, the mineral, synthetic fillers and functional additives are chosen from the group consisting of magnesium oxysulfate fibers, calcium metasilicate, mica, muscovite type mica or glass (chopped or milled glass particles), and combinations of any thereof. In other embodiments, the synthetic fibers belong to the group of magnesium oxysulfate fibers. In still other embodiments, the EMVG, c-EMVG or a combination thereof is combined with synthetic fibers in any percentage from 5/95 to 95/5 ratios. In further embodiments, the calcium metasilicate can be high or low aspect ratio grades of wollastonite fibers. In still further embodiments, the EMVG or c-EMVG is combined with wollastonite fibers in any percentage from 5/95 to 95/5 ratios. In some embodiments, the mica is a muscovite type. In other embodiments, the EMVG or c-EMVG is combined with mica in any percentage from 5/95 to 95/5 ratios. In further embodiments, the glass is milled or chopped glass. In still further embodiments, the EMVG or c-EMVG is combined with Chopped glass/Mica in any percentage from 5/95 to 95/5 ratios. In some embodiments, the plastic is polyolefin. In other embodiments, the polyolefin is polypropylene. In further embodiments, the plastic is an engineering alloy. In one embodiment, the engineering alloy is nylon. In other embodiments, One embodiment includes a method of controlling odor in TPO's (thermoplastic polyolefins) comprising applying EMVG, c-EMVG or a combination thereof to the TPO and PA plastic compounds. Certain embodiments include a method of reducing the density of the TPO's and PA's and making a lightweight structure by using EMVG, c-EMVG, other mineral or synthetic fillers or functional additives or a combination thereof to the TPO or PA plastic compound. In some embodiments, the weight ratio of the reinforcing filler to the glass fiber is no less than 1:19. In other embodiments, the weight ratio of the reinforcing filler to the glass fiber is no less than 7:3. In further embodiments, the weight ratio of the reinforcing filler to the glass fiber is no less than 3:2.

One embodiment includes a method of reducing the cost of a plastic by 2-80% by using EMVG, c-EMVG, other mineral or synthetic fillers or functional additives or a combination thereof to the plastic. Another embodiment includes a method of preparing a reinforced plastic resin compound. Certain embodiments include mixing at least one resin with at least one functional filler in an extruder. In some embodiments, the at least one functional filler is EMVG, c-EMVG, or combinations of any thereof. Other embodiments include introducing the at least one functional filler into the extruder through a downstream side feeder.

In one embodiment, EMVG or c-EMVG can completely or partially replace talc in TPOs (thermoplastic polyolefins). In some embodiments, the EMVG or c-EMVG can replace talc in TPOs (thermoplastic polyolefins) to reduce odor. In other embodiments, combination minerals of c-EMVG and synthetic fibers can completely or partially replace micronized talc in TPOs (thermoplastic polyolefins). In still other embodiments, combination minerals of c-EMVG and synthetic fibers can completely or partially replace chopped glass in TPOs. In further embodiments, combination minerals of c-EMVG and synthetic fibers can completely or partially replace talc in TPOs. In still further embodiments, combination minerals of c-EMVG and c-HAR wollastonite can completely or partially replace micronized talc in TPOs. In certain embodiments, combination minerals of c-EMVG and c-HAR Wollastonite can completely or partially replace Chopped glass in TPOs. In some embodiments, combination minerals of c-EMVG and c-Mica can completely or partially replace micronized talc in TPO. In other embodiments, combination minerals of c-EMVG and c-Mica can completely or partially replace Chopped glass in TPOs. In still other embodiments, c-EMVG can be a partial replacement of chopped glass in an all glass formulation in Engineering Alloys. In some embodiments, the engineering alloy can be nylon 6, nylon 66, PC/ABS, PET/PBT, LCP, PC/ABS, LCP PET/PBT, or PPE-PA. In other embodiments, c-EMVG can completely or partially replace calcined clay plus a percentage of the chopped glass in glass/mineral compounds in Engineering Alloys. In further embodiments, c-EMVG can completely or partially replace talc plus a percentage of the chopped glass in glass/mineral compounds in Engineering Alloys.

One embodiment includes a method of improving corrosion resistance of a powder coating comprising of adding EMVG or c-EMVG to the powder coating formulation. In some embodiments, the EMVG or c-EMVG can completely or partially replace zinc dust in the formulation. In other embodiments, the EMVG or c-EMVG can replace zinc dust in an Epoxy DICY formulation. In further embodiments, the EMVG or c-EMVG can replace zinc dust in an Epoxy Phenolic formulation.

DESCRIPTION OF THE FIGURES

A more complete understanding of this disclosure may be acquired by referring to the following description taken in combination with the accompanying figures in which:

FIG. 12 shows a SEM image of mica platelets

Figure 1:
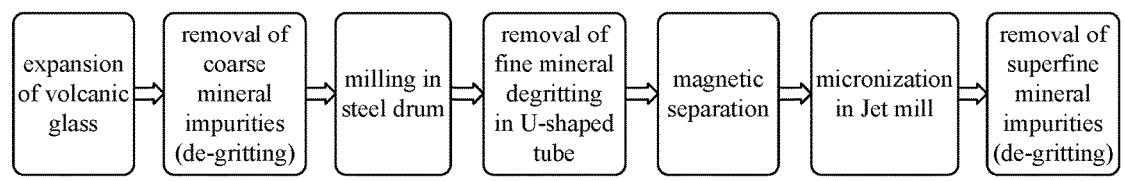
FIG. 1 shows an embodiment of an EMVG production process.

While the present disclosure is susceptible to various modifications and alternative forms, specific example embodiments have been shown in the figures and are herein described in more detail. It should be understood, however, that the description of specific example embodiments is not intended to limit the invention to the particular forms disclosed, but on the contrary, this disclosure is to cover all modifications and equivalents as described herein.

DESCRIPTION

Unless indicated otherwise, ranges of numbers described herein are understood to include the range of values in between the numbers recited, in addition to including the numbers themselves. For example, a range from 1 to 10 is understood to include all numbers between 1 and 10, and including 1 and 10. In addition, unless otherwise indicated, it is understood that all numbers herein are modified by the word "about."

Volcanic Glasses

Hydrated volcanic glasses are naturally occurring siliceous rocks that are expandable, i.e. when heated rapidly to a suitable point in its softening range, they expand from four to twenty times its original apparent volume. There are also forms of volcanic glasses that are already very porous "in situ" and thus they yield granular material of similar, high apparent volume without expansion.

The main constituent of volcanic glasses is amorphous silica (65-76% $SiO_2$), while they contain lower quantities of alumina, potassium, sodium, calcium, iron and magnesium. Part of the total alkalis ($Na_2O+K_2O$=6-10%) is present in the amorphous matrix forming a solid solution. Expansion of the granules of expandable hydrated volcanic glass is due to the presence of "combined" or "chemically bound" water (e.g., OH—, silanol groups SiOH, $H_2O$ molecules) in the crude rock. Those types of "water" are known to dramatically affect a number of properties: when quickly heated to above softening point (600-650° C.), the volcanic glass enters the "softening area" and the contained water forms forces the granules from inside to "pop" in a manner similar to popcorn as the $H_2O$ vaporizes and creates countless tiny bubbles which account for the light weight (e.g., very low Loose Bulk Density) and other exceptional physical properties. Well known expandable minerals/rocks of this category are perlites with combined water of 2-5 wt % and pitchstone or expanded pumicites with combined water above 5%.

The production of expanded volcanic glass is a two-stage process. The ore is firstly mined, pre-crushed, ground and graded in the plant, which is usually located nearby the mine and close to the loading/shipping point. The graded granular volcanic glass is then transported to the expansion plants (by ships or rail cars) where it is expanded to form lightweight granules in vertical or horizontal expansion furnaces. Expanded volcanic glass and especially expanded perlite have been used as lightweight insulating materials, as horticultural and hydroponic media, as oil absorbents for treating oil spills and as chemical carriers.

For all those known applications, production parameters are controlled in such a way that expanded perlite granules combine two properties: 1) they have a pre-specified relatively low loose bulk density, and 2) at the same time, they retain the semi-spherical shape intact as much as possible. The combined properties are achieved by expanding the raw volcanic glass granules in a smooth way. Specifically, in order to reduce the violent expansion of raw perlite in the furnace, the combined water of raw perlite fed to the furnace needs to be below 4% by weight, preferably below 3.5% and most preferably below 3%. That can be achieved either by selective mining of perlites and other expandable volcanic glasses with combined water below 4% by weight or, in the most of the cases, by preheating raw perlite before feeding to the expansion furnace so as to reduce combined water content at the desirable levels. For keeping expansion as smooth as possible, raw perlite is fed to the vertical furnace at distances from 2 up to 4 m above the flame depending on the grain size distribution. This technique allows for raw perlite to be heated gradually up to softening point. Moreover, fuel consumption and air draft settings are kept under strict control and within a range that raw perlite is residing in the furnace for a certain time so as to expand and yield well shaped semi-spherical bubbles and not disintegrate and break apart into tiny flakes.

Expansion and Milling Process—Production of EMVG

EP 2 444 460 A1 describes a milled volcanic glass filler consisting either of expanded perlite, or natural pitchstone or natural pumicite or expanded pumicite, wherein the perlite, or pumicite originally comprises a combined water content more than 2.0% by weight before being expanded, or which comprises iron content less than 1.0 wt %, which comprises total alkalis content ($Na_2O+K_2O$) more than 6.0%. The graded ore is expanded intentionally in such a way and milled, afterwards, so as to achieve a median particle size less than 10 μm and preferably less than 5 μm and at the same time its particles have a lamellar shape of nil-curvature or near nil-curvature and an aspect ratio more or equal than 5:1. This volcanic glass based lamellar filler is suitable for use as $TiO_2$ extender in paints, as IR retaining additive in LDPE films and as volume resistivity enhancer in cable covers.

EP 2 444 460 A1 also explains that graded hydrated volcanic glasses like pitchstone or expanded pumicite, perlite, pumicites or other hydrated volcanic glasses, susceptible to expansion at elevated temperatures, can be expanded in a special way inside any type of expansion furnace so as the maximum possible number of fractured expanded perlite grains to be created. This is contrary to what normally happens in expansion plants, where expansion conditions are chosen in such way so as volcanic glass grains—such as expanded perlite- to be after expansion as intact as possible. In the controlled expansion conditions described in this invention, specially shaped particles of volcanic origin are expanded in such a way so as to look like broken Christmas balls—intact bubbles are not desired. Depending on the expansion degree, the milling conditions (micronization) afterwards and the targeted fineness, the produced end product, e.g., the platelets can have controlled high aspect ratio (more than 5:1) and near zero or zero curvature. Moreover, these volcanic glass flattish flakes retain their key properties (whiteness, yellowness, etc.) in the same range as talc and calcined kaolin. The disclosure of EP 2 444 460 A1 is incorporated herein by reference.

Expanded perlite, natural pitchstone or natural pumicite selected in certain embodiments to have the specific chemical profile mentioned above, and in further embodiments expanded in the specific way described above and in still further embodiments afterwards milled as indicated above so as its median particle size to be less than 10 μm and preferably less than 5 μm and at the same time its particles to have a lamellar shape of nil-curvature and an aspect ratio more or equal than 5:1 and preferably more or equal than 10:1, is hereinafter referred to as expanded and micronized volcanic glass, or "EMVG." In other embodiments, coated EMVG with any type of chemical agent described herein is hereinafter referred to as "c-EMVG".

Surface Treatment of Inorganic Fillers

The surface of fillers and reinforcements exhibit a more or less pronounced affinity for a polymer; therefore, the compatibility to the matrix varies widely, thus affecting dispersion and performance. To achieve control over the functionality of the filler surface, modification with special treatments has frequently led to the development of appropriate methods and substances. Practically all surface treatments are designed to bond an organic molecule physically or chemically to the filler surface. If chemical bonding from the mineral surface to a resin system is required, bi-functional molecules known as "coupling agents" must be used. These coupling agents provide a chemical link both to the filler surface and to the matrix. Evidently, there is a lower limit to get a significant effect and an upper limit based on cost and surface saturation.

Applications for EMVG and c-EMVG

Odor control in plastic parts and components and especially in those used in the automotive interior is becoming more and more a key issue to be addressed by plastics industry. In one embodiment, the materials described herein are used to reduce or control the odor from plastic parts and components.

Another field of interest is the functional anticorrosive fillers used in epoxy and probably other powder coating systems. Galvanizing compositions are made from zinc "ingots" and become oxidized only when exposed to the elements. The high conductivity of galvanizing compositions provides excellent cathodic protection to steel (which acts as the cathode, zinc being the anode), when exposed to a saline environment or other forms of oxidation caused primarily by water in its various forms, moisture, vapor and ice. In another embodiment, the materials described herein are used as an anti-corrosion additive to coating systems.

The present disclosure generally relates to a composition comprising an expanded and micronized volcanic glass (EMVG) or an EMVG comprising at least one chemical agent, wherein the at least one chemical agent is coated on the surface of the volcanic glass (c-EMVG). In certain embodiments, these compositions may additionally be used as inorganic fillers to improve dispersion, performance and coupling.

Production of EMVG

In certain embodiments, the sequence of milling and separation/beneficiation stages is presented graphically in FIG. 1. In some embodiments, the process for the EMVG production constitutes of seven stages: expansion of volcanic glass, removal of coarse mineral impurities (de-gritting), milling in steel drum, removal of fine mineral degritting in U-shaped tube, magnetic separation, micronization in jet mill, and removal of superfine mineral impurities (de-gritting).

Expansion Process (Stage 1 of FIG. 1)

In the present invention, the volcanic glasses, including raw perlite or pitchstone or expanded pumicite or expandable pumicite, is expanded by heating up at conditions where raw perlite is expanded as violently as possible. In certain embodiments, this is achieved by using volcanic glasses with combined water content as high as possible, and in one embodiment above 2.0% by weight, in another embodiment more than 3.0% and in a further embodiment more than 4.0% by weight. In certain embodiments, the volcanic glass is a perlite, a pitchstone, a pumicite or a combination thereof.

Moreover, in certain embodiments, any preheating, thermal pre-treatment or calcination processing of raw material prior to the feeding in the expansion furnace should be eliminated and avoided. In other embodiments, raw perlite should be fed as close to flame as possible, with avoidance of glassification of raw volcanic glass (where all particles are sintered in glassy agglomerates). Finally, in one embodiment, the temperatures, even in the upper part of the expansion furnace tube and close to the ending curve of it, should be kept well above 650° C., in another embodiment above 700° C. and in a further embodiment above 750° C. up to 1100° C. and keep at the same time the volume rate of the air draft ($Nm^3$/min) as low as possible, in certain embodiments, ranging between 1.000 to 10.000 $Nm^3$/h, in other embodiments, ranging between 3.000 to 6.000 $Nm^3$/h. The temperature and the draft air volume depends significantly on the softening point and the combined water content of the feed volcanic glass and therefore, it is difficult to be predetermined for any volcanic glasses. In certain embodiments, the size of the raw volcanic glass particles that are fed in the expansion furnace could be lower than 5 mm and greater than 0.045 mm, in another embodiment, below 1 mm and in a further embodiment, less than 0.6 mm. The result of the expansion under these conditions would be fractured expanded perlite shells similar to egg shells or broken hollow spheres. Similar outcome could be achieved with other type of expansion furnaces like double- or single-wall horizontal ones with gas flame, vertical electrical ones with controlled temperature zones or with microwave induced expansion furnaces.

Milling Process (Stage 3 of FIG. 1)

In certain embodiments, a sequence of milling and separation stages can be used. In one embodiment of the milling stage, the violently expanded volcanic glass is entering a steel drum containing a vertical or horizontal rotating shaft or drum on which hammers are mounted. The hammers are free to swing on the ends of the cross, or fixed to the central rotor. The rotor is spun at a high speed inside the drum while material is fed into a feed hopper. The material is impacted by the hammer bars and is thereby shredded and expelled through screens in the drum of a selected size.

In another embodiment, consequently the material enters air separation chamber, which is equipped with a fan that can classify material according to its grain size, fine material passes through the fan and is air transferred for further processing while coarser material recirculates into the mill for further shredding.

De-Gritting Process (Stages 2 and 4 of FIG. 1)

Figure 2:
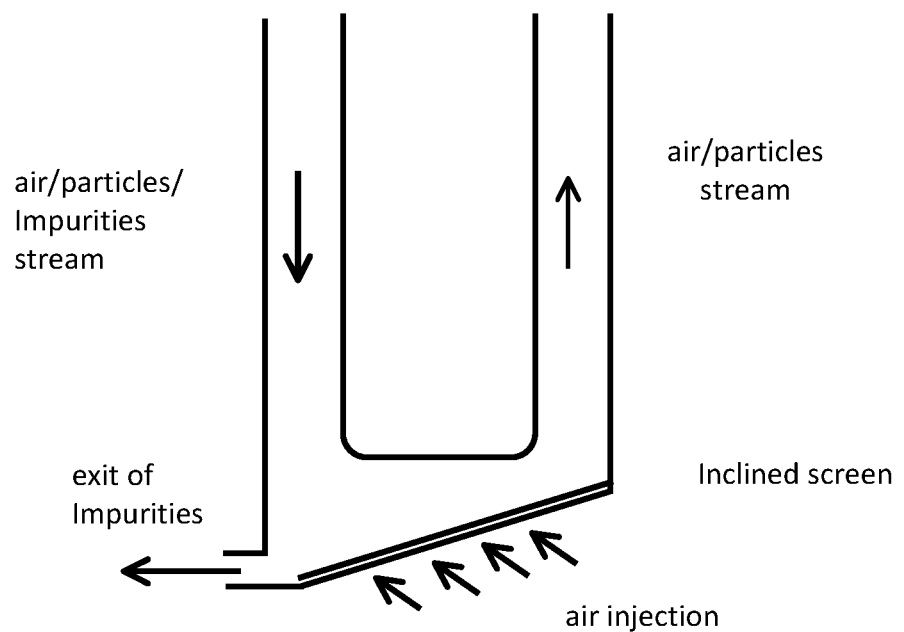
FIG. 2 shows an embodiment of a schematic de-gritting system.

In certain embodiments, impurities are then removed from the material. In some embodiments, a special u-shaped system is used for the beneficiation of expanded and of shredded (milled in the steel drum), corresponding to stages 2 and 4 of FIG. 1. The de-gritting system comprises a u-shaped custom-made tube, which has a settling chamber at the lower part. The material is transferred with the air stream downwards and when entering the chamber the velocity of particles is reduced. The impurities which are heavier than volcanic glass hit due to gravity on a 45 degrees inclined screen adjusted at the lower part of the settling chamber, are collected on the screen and removed by the lower edge of the inclined surface. The impurities—free material continues travelling in the air stream upwards and is transferred to further processing. An air injection system vibrates the screen to prevent blocking and helps the removal of the collected impurities. A schematic representation of the de-gritting system is shown in FIG. 2.

In some embodiments, the u-shaped de-gritting system is applied in two stages: a) after expansion of volcanic glass, where the purpose is the removal of coarse heavy mineral impurities (crystalline minerals or unexpanded material); and b) after milling in the steel drum in order to remove fine heavy mineral impurities, such as crystalline minerals.

Magnetic Separation/Micronization Process/De-Gritting (Stages 5, 6 and 7 of FIG. 1)

In certain embodiments, the outcome of this expansion stage is further micronized using a micronization mill. There are several processing devices in the industry to cover the milling process to micronization level. In one embodiment, milling is done via stirred media with ceramic lining, in combination with air classifier to obtain the micronized product. Alternative embodiments include jet milling.

Certain embodiments of the present invention are directed to a system comprising a mill and at least one adjacent de-gritter, wherein the at least one de-gritter is capable of removing mineral impurities from expanded volcanic glass. In certain embodiments, the at least one adjacent de-gritter is capable of removing the mineral impurities before the expanded volcanic glass being milled. In other embodiments, the at least one adjacent de-gritter is capable of removing the mineral impurities after the expanded volcanic glass being milled.

In a further embodiment, the system comprises at least two adjacent de-gritters, wherein the first adjacent de-gritter is capable of removing the mineral impurities before the expanded volcanic glass being milled, and the second adjacent de-gritter is capable of removing the mineral impurities after the expanded volcanic glass being milled. In other embodiments, the at least one adjacent de-gritter comprises a U-shaped tube.

In some embodiments, the mill includes a ball mill, pebble mill and jet mill. Other embodiments include a Fluidized-bed jet mill, spiral flow jet mill and opposed jet mill. In a further embodiment, the mill includes a fluidized-bed jet mill with air classification system, like Hosokawa (Summit, N.J. USA) Alpine Fluidized Bed Opposed Jet Mill 710/4 AFG and NETSCH (Hanau, Germany) Condux CGS Fluidized Bed Jet Mill.

Figure 3:
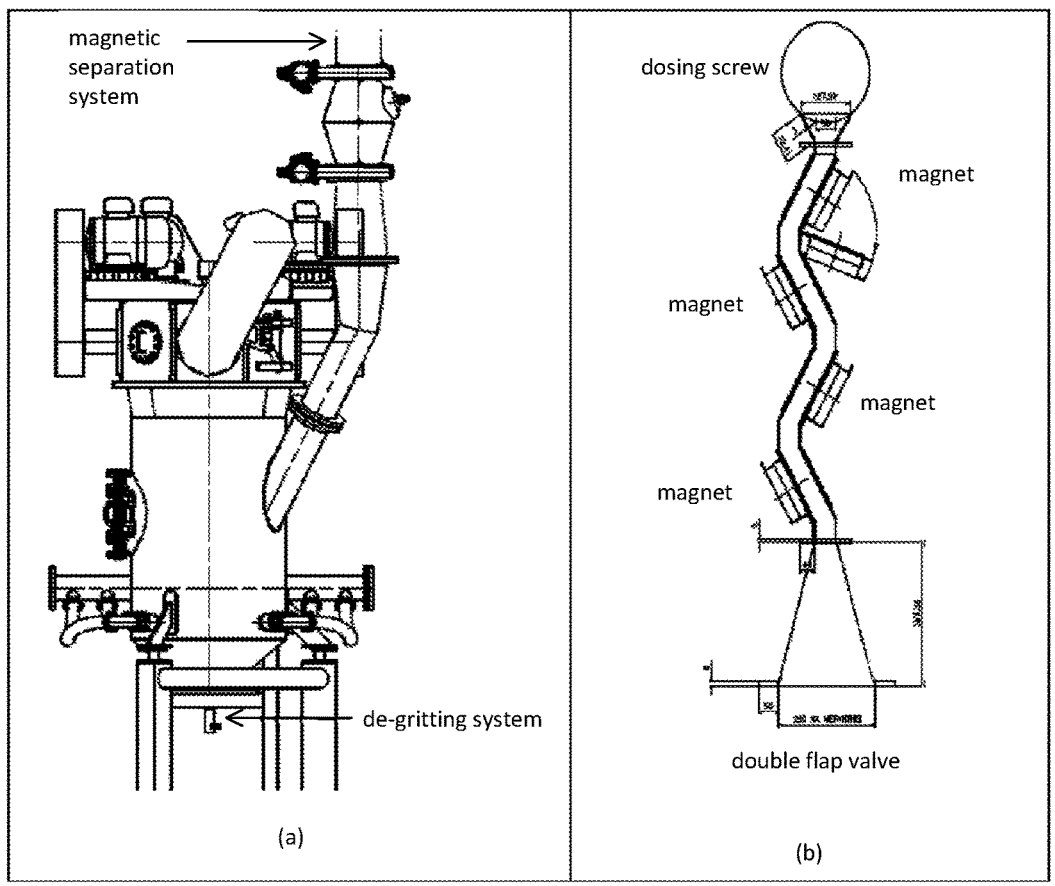
FIG. 3 shows drawings of embodiments of a jet mill with purification system a) fluidized jet-mill with magnetic separation and de-gritting system b) detail of magnetic separation system

In certain embodiments of a fluidized jet mill which combines a purification system, the feed product is conveyed through the feed opening into the grinding chamber by means of a dosing screw into a rectangular tube where four magnets are adjusted. (See FIG. 3b). The magnets are used for the purification of the material and the removal of the ferromagnetic matter. After the magnetic separation the magnetic-free material is transferred by double-flap valve into the grinding chamber of the jet mill.

In certain embodiments, inside the jet-mill, the material particles are accelerated and collide with each other and thus their particle size is reduced. The material particles are fluidized by the air jets exiting the opposed nozzles. The micronized expanded perlite particles are transported upwards in a fountain like stream to the classifying wheel, and then through the discharge duct to the cyclone and/or filter, where they can be removed as final product.

In some embodiments, any coarse or unground product rejected by the classifier flows back down the wall of the grinding chamber into the fluidized bed. At the lower part the jet mill is equipped with a de-gritting system that comprises a conical fitting where the impurities (crystalline silica, cristobalite, mica, feldspars, etc.) are collected and a relief valve that opens in 10-15 min intervals to remove the impurities collected. (See, e.g., FIG. 3a).

In certain embodiments, then the processed volcanic glass is processed in a mill. In one embodiment, the processed volcanic glass is processed in a jet mill. In a further embodiment, it is processed in a fluidised-bed jet mill which is equipped with a specially designed de-gritter, which in combination with the mill back pressure is further cleaning the processed expanded volcanic glass from impurities like crystalline silica, cristobalite, mica, feldspars, etc. The adjustment of air parameters (grinding air-flow, draft) of the jet mill creates a constant fluidized bed, where the particles suspend and due to gravity forces the heavier impurities move to the lower layers of the bed. The air classification system of the mill creates a back pressure and the micronized light particles of EMVG are collected from the top while the heavier particles of impurities are transferred to the bottom and are collected in the specially designed de-gritter.

Another embodiment of the present invention is directed to a method of producing EMVG comprising:
 (a) expanding volcanic glass;
 (b) milling the expanded volcanic glass; and
 (c) removing ferromagnetic matter from the milled volcanic glass.

In certain embodiment, the method further comprising (d) removing other mineral impurities. In certain embodiments, either (c) or (d) in the above-stated method can be optional.

EMVG Particles

In certain embodiments, the EMVG or c-EMVG is substantially free of mineral impurities. In further embodiments, the mineral impurities are ferromagnetic matter, crystalline silica, cristobalite, mica, feldspars, or a combination thereof.

In certain embodiments, the amount of these impurities are in the range of 5-10% wt in the prior art, while in the present invention, in certain embodiments, the achieved range is 2-5% wt and in other embodiments, is below 2% wt. In certain embodiments, due to the sequence of milling and separation/purification stages, the iron content of the milled lamellar filler derived from expanded volcanic glass is reduced to less than 1.0% wt, and in some embodiments down to 0.6% wt, and in further embodiments less than 0.6% wt. In other embodiments, the quartz content is reduced to less than 1.5% wt. On other embodiments, the quartz content is reduced to less than 1.0% wt, and in some embodiments down to 0.1% wt, and in still further embodiments less than 0.1% wt. In still further embodiments, in the x-ray diffraction analysis of the milled lamellar filler derived from expanded volcanic glass, substantially no feldspars, mica or other crystalline mineral peaks are detected.

In certain embodiments, the final product is a substantially lamellar/flat particle. In certain embodiments, the final product is a lamellar/flat micronized filler with mass median size, $d_{50}$ less than 10 μm, in other embodiments, less than 6 μm. In some embodiments, the particle has nil or near nil curvature. In further embodiments, the particle has an aspect ratio more than 7:1 and up to 35:1. The aspect ratio of the platelets corresponds to the diameter of the equivalent circle divided by the platelet thickness, where the equivalent circle is the circle of the same area as the platelet surface. Parameters such as feed material loading, rotation speed of the classifier wheel, inlet air pressure and temperature are optimized to achieve various embodiments for desired products.

Figure 4:
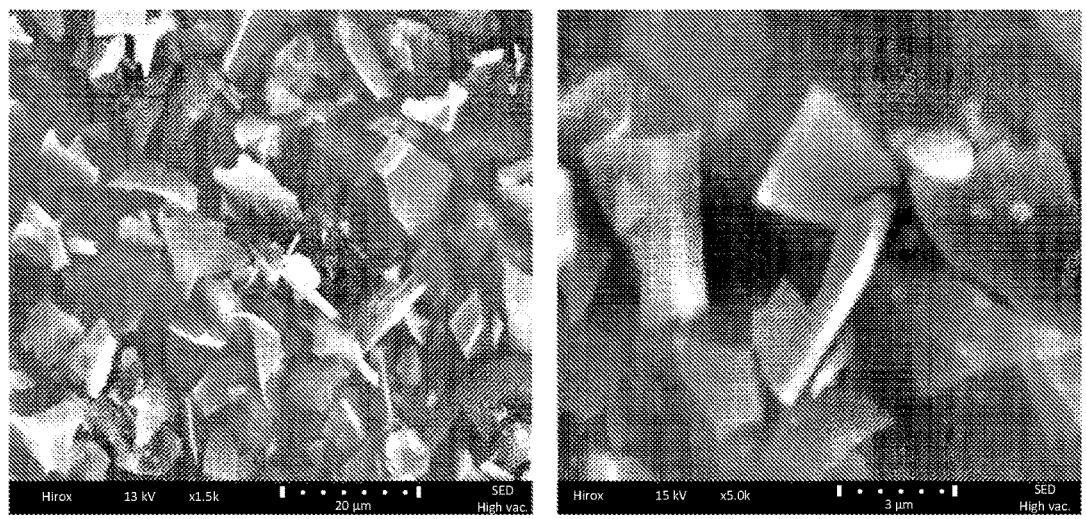
FIG. 4 shows Scanning Electron Microscopy (SEM) images of embodiments of EMVG particles.

In one embodiment, working ranges of these parameters are air inlet pressure from 7 up to 12 bar and air temperature from 100 up to 200° C., classifier rotation speed from 1000 up to 6000 rpm and feed material loading from 10 up to 2000 Kg/h. In certain embodiments, the combination of the described expansion process together with the described milling process leads to a flat lamellar filler consisting of platelets without curvature or substantially without curvature and, in certain embodiments, with aspect ratio larger than 7:1, in other embodiments, larger than 10:1 and in further embodiments, larger than 15:1, as can be seen also in the Scanning Electron Microscopy (SEM) micrograph (See, FIG. 4).

In one embodiment, the milled lamellar filler derived from expanded volcanic glass as described above has a median particle size less than 10 μm, in another embodiment, less than 7 μm and in a further embodiment, less than 3 μm as determined by laser particle analysis method. In certain embodiments, the milled lamellar filler is further characterized by having whiteness, i.e. reflectance values under a green filter measured in a colorimeter according to DIN53145, greater than 82; in another embodiment greater than 86.

In certain embodiments, the derived lamellar filler has an oil absorption value less than 70 grams of linseed oil per 100 grams of filler and in another embodiment (depending on the median particle size) less than 60 grams of linseed oil per 100 grams of filler; in still a further embodiment less than 50 grams of linseed oil per 100 grams of filler using a surface treatment on the EMVG, measured according to Gardner-Coleman Method—ASTM D1483-95.

Surface Treatment of Inorganic Fillers—Production of c-EMVG

In present invention, the EMVG can be surface treated with at least one chemical agent, in certain embodiments, that can be a non-reactive polymer based or reactive wetting silanated agent or a reactive coupling agent. In another embodiment, the EMVG is treated with two chemical agents.

In certain embodiments, the chemical agent is applied by a dry coating technique. Another embodiment of the present invention is directed to a method of producing c-EMVG comprising:

(a) expanding volcanic glass;
(b) milling the expanded volcanic glass; and
(c) coating the EMVG with at least one chemical agent.

The principle of the dry coating technique is based on the evaporation of either solid or liquid coating agents and then vapors are transferred and deposited onto the surface of the material particles to be coated, creating special multiple covalent chemical bonds, such as hydrogen bond between the coating agent's silane and the silanol group of the filler, or direct bonding between the oxygen of the coating agent's silane and the silicon atom of the filler's silanol group. The dry coating technique can be applied on a variety of materials, such as porous minerals like expanded perlite or vermiculite, micronized or other functional fillers.

In one embodiment, the hydrophobation process is summarized in

Figure 5:
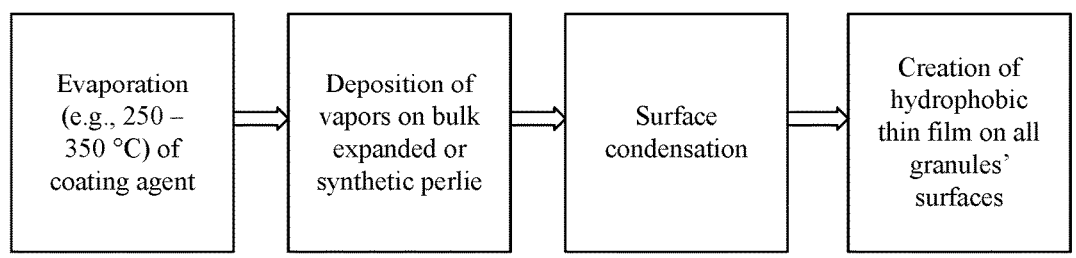
FIG. 5 shows a schematic of an embodiment of a surface treatment process.

FIG. 5. The coating agent (solid elastomer mixture of a combination of Dimethyl siloxane, dimethylvinyl-terminated and Dimethyl, methylhydrogen siloxane) is evaporated at 250-300° C. and the vapors are transferred and deposited on EMVG. The deposition is followed by surface condensation and eventually by the creation of an oligomolecular hydrophobic film on the EMVG.

Figure 6:
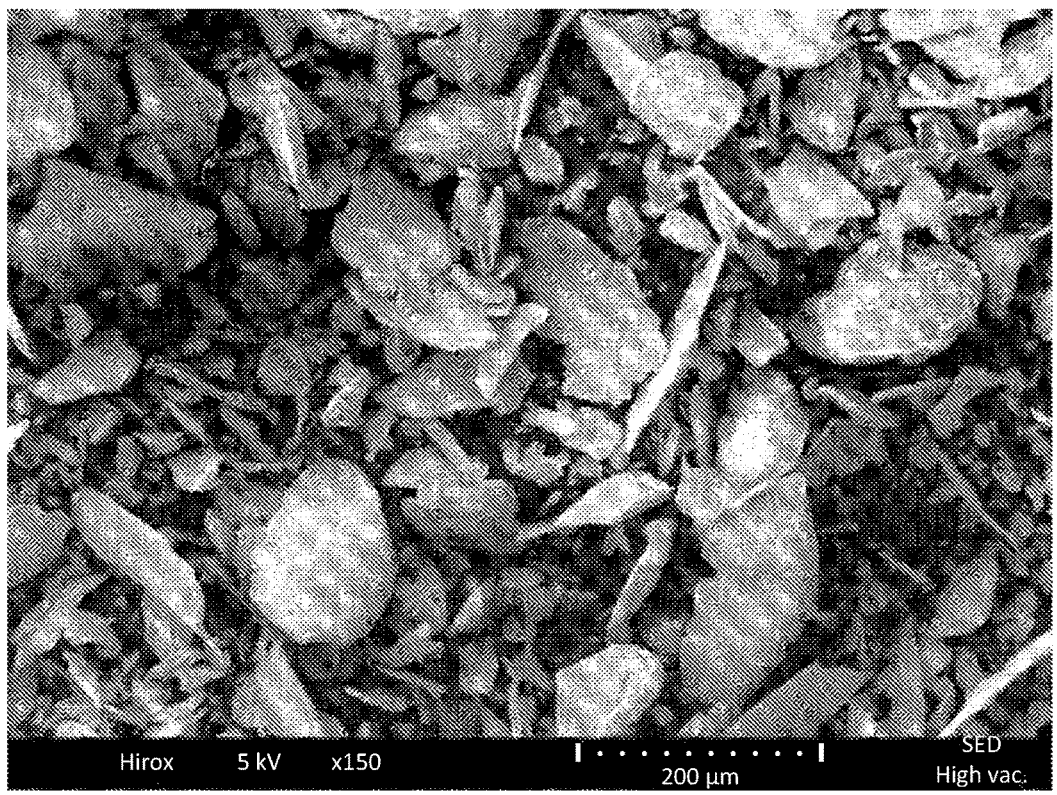
FIG. 6 shows exemplary alternative embodiments of techniques of coating process.

In other embodiments, the dry coating process can be materialized in lab or industrial scale by 2 alternative techniques (FIG. 6):

(1) a vertical cylinder-like industrial-scale reactor (see FIG. 6-a); and
(2) a rotating horizontal tube-like lab-scale reactor (see FIG. 6-b).

In one embodiment, innovative industrial equipment for the application of the 1$^{st}$ technique (vertical cylinder) for the surface coating of EMVG or other functional fillers has also been developed and is described hereinafter. The equipment consists of a vertical cylindrical reactor of 0.8 m diameter and 1.5 m height, equipped parametrically with electrical resistances and appropriate insulating mantle. At the one side of the reactor there are three apertures and an additional one at the top, of 0.15 m diameter and in these apertures perforated cylindrical cases, of 0.8 m length and 0.15 m diameter, can be adjusted. The cases are appropriately perforated in order to be capable of bearing coupling or/and wetting agents, in solid as well as in liquid form. The reactor also comprises an air feeding system and a cyclone, to feed air from the bottom part in order to keep the material to be coated in a fluidized bed and the coating agent fumes circulating in the system and among particles of the material to be coated, to accelerate coating process.

Figure 7:
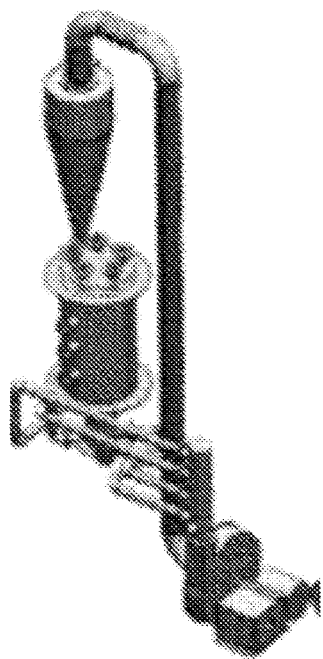
FIG. 7 shows drawings of embodiments of the equipment developed for dry coating method a) system with reactor and air feeding system (cyclone, fan) b) detail of apertures on the reactor.
Figure 7:
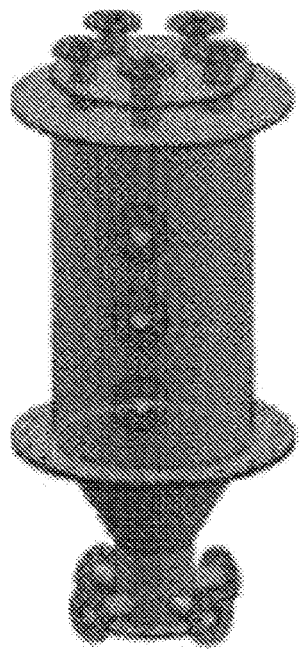

The reactor is filled with the EMVG or other functional filler or material to be coated up to 0.75 m$^3$ volume and the perforated cases are filled with coating agents and placed inside the reactor. Then the reactor with the material is heated at a temperature of 250-300° C., the temperature depending on the type of coupling/wetting agents used, and the material remains at this temperature for 1 to 4 hours, depending on the quantity and type (particle size distribution, surface area) of the material to be coated. After the completion of the coating processing the material is discharged from the bottom part of the reactor, by opening a cover designed for this purpose. Drawings of the coating method system and the reactor are presented in FIG. 7. Examples of surface treatment techniques applied to the EMVG or other materials are given below.

Example 1

According to a first technique, the coupling agents or wetting agent were added in the device previously described with the EMVG. The chamber was heated at a temperature 250-300° C. and the retention time was 1.5 hours. About 0.63 kg of coating agent was used per $m^3$ of EMVG.

Example 2

According to a second technique, a special cylindrical reactor was used. EMVG was first added inside the reactor and then coupling agent was added inside in a box-like chamber, attached to the shaft of the reactor with a ring, in order to avoid rotation. The temperature was increased at 250-300° C. so as to achieve chemical compounds evaporation and the diffusion of vapors into the reactor, through the holes on the top surface of the box-like chamber. Moreover, the reactor was slowly rotated in order to achieve more homogeneous conditions inside the reactor and thus obtain homogeneously hydrophobized material. The retention time was 2 hours. In this reactor, around 1 kg of solid chemical compounds was used per $m^3$ of EMVG.

In another embodiment, the surface coating process entails a two stage process where the surface treatment agent is evaporated and the vapours are passed through an intermediate system where they remain at vapour state. Then vapours are transferred and deposited on EMVG particles surface in a semi-continuous mixing chamber.

In still another embodiment, the EMVG is initially treated with a dual system comprising of a chemical in liquid form and another chemical in a dry form to enhance further the reinforcing effect of the filler and the polymer matrix.

In certain embodiments, the present invention describes a surface coating process of a filler, which occurs prior to adding the filler to a resin (or other material that the filler is being used in), and is independent from the compounding process of the resin itself. In other words, the chemical agent or agents are added to the filler or EMVG before the EMVG is added to the resin or other material.

Coupling Agents for Surface Modification

In certain embodiments of the present invention, the following primary surface modification treatments can be used:

Primary Surface Modification Treatments

| Chemical Functionality |
| --- |
| Amino- |
| Methacryl- |
| Epoxy- |
| Vinyl- |
| Halo-alkyl- |
| Hydrophobe |
| Lubricant |

| Chemical Functionality |
| --- |
| Alkyl- |
| Lubricant modified amino- |
| Urethane Polymer |
| Hydrophobic vinyl- |
| Hydrophobic amino- |
| Hydrophobic, (reduced level)amino- |
| Hydrophobic methacryl- |
| Dual amino- & methacryl- |
| Hydrophobic epoxy- |

In certain embodiments, typical surface treatments applied are the following coupling agents: 1-propanamine, 3-(triethoxysilyl)-, aminosilane surface trimethoxy [3-(oxiranylmethoxy)propyl], epoxysilane 2-propenoic acid, 2-methyl-,3-(trimethoxysilyl) propyl ester-methacrylsilane, ethenyltriethoxy, vinylsilane (3-chloropropyl) trimethoxy, halo-alkyl-(chloropropyl-), 1,2-ethanediamine, N-[3-(trimethoxysilyl)propyl], silane, ethoxytrimethyl, 2,5,7,10-tetraoxa-6-silaundecane, 6-ethenyl-6-(2-methoxyethoxy).

In certain embodiments, the following agents can be used with the corresponding functionality: glycidyloxypropyltrimethoxysilane (GLYMO)=high compatibility with epoxy; tridecafluorooctyltrimethoxysilane=oleophobicity+hydrophobicity; methyacryloxypropyltrimethoxysilane (MEMO) =scratch resistance; triethoxy-propyl-aminosilane (TEPAS)+HMDS=high pH silica−9, + electrostatic charge; octamethyl-cyclo-tetra-siloxane (D4)=low residual HCl, improved clarity; hexa-decyl-silane (C16)=wets into water; poly-dimethyl-siloxane (PDMS)=high hydrophobicity; hexamethyl-di-silazane (HMDS)=pH neutral; trimethoxy-octylsilane (TMOS)=long chain–high polar stability, no PDMS; dimethyl-dichloro-silane (DDS)=high OH conversion.

In one embodiment, the chemical treatment may be a polymer, emulsion or wax that is basically deposited or melted onto the surface of the mineral. An example would be a PP grafted maleic anhydride or a water based polymer emulsion. These types of surface treatments do not form a chemical bond to the surface of the EMVG and do not act as a coupling agent from the EMVG surface into the resin system. This type of surface treatment is typically used to impart an improved mechanical property in the resin system, such as impact property.

In one embodiment, the polymer may be a solid elastomer consisting of dimethyl siloxane, dimethylvinyl-terminated and dimethyl, methylhydrogen siloxane. In another embodiment, the polymer may be a PP grafted maleic anhydride. In a further embodiment, it may be a maleic anhydride functionalized polypropylene.

In one embodiment, the emulsion may be a water based emulsion. In a further embodiment, the water based emulsion may be an organomodified polysiloxane, PP polymer, or urethane polymer.

In another embodiment, the chemical treatment can also be an organo based silane that has the generic structure such as R—$(CH_2)_n$—Si—$X_3$ where R is a non-hydrolyzable organic moiety that can be either an alkyl, aromatic or organofunctional. These groups provide organic compatibility within a resin system or in the case of reactive organofunctional silanes to co-react within the polymer.

In one embodiment, the R-group may be an alkyl, aryl or aromatic to improve gloss, hiding power, mixing time, and other properties related to improved mineral dispersion. Alkyl, aryl and aromatic silanes are also utilized to provide hydrophobic surfaces to the mineral surface for moisture sensitive application. The X represents alkoxy moieties, most typically methoxy or ethoxy, which react with the various forms of hydroxyl groups and liberate methanol or ethanol. These groups can provide the linkage with inorganic substrates, pigment, or filler to improve coating integrity and adhesion. In one embodiment, the alkyl group may be polyalkyleneoxidealkoxysilane. In one embodiment, the aromatic group may be a phenyltrimethoxysilane.

In one embodiment, the R-group is an organofunctional group such as amino, epoxy, or vinyl or some other group that can react into the organic resin (i.e. plastic resin compound) while the X group establishes the chemical covalent bond with the EMVG surface. More complex R-groups can be used which contain more than one of the same type of organofunctional group for increased reactivity with the organic resin.

In one embodiment, the organofunctional group is amino such as 3-aminopropyltriethoxysilane. In another embodiment, the organofunctional group is epoxy such as 3-glycidoxypropyltrimehtoxysilane. In a further embodiment, the organofunctional group is an organosilane ester such as vinyltriethoxysilane. In yet another embodiment, the organofunctional group is a methacryl such as 3-methacryloxypropyltrimethoxysilane. In another embodiment, the organofunctional group is a halo-alkyl such as 3-chloropropyltrimethoxysilane. In still another embodiment, the organofunctional group is more complex and has more than one functional group in the R-group.

In a further embodiment, the multi-functional R-groups may be multiple amine groups such as 3-(2-aminoethyl-amino)propyltrimethoxysilane.

In one embodiment, a still further variation of the surface treatment can be put onto the EMVG using a combination of an emulsion, polymer or wax and an organo silane type chemical. The combination is applied at the same time. The preferred type would be organo silane and an emulsion in an amount of up to 1-2 wt % of each type.

In embodiments where the surface treatment is functioning as a wetting/lubricating agent to improve flowability and dispersion, then agents like polyethyleneglycol-functional alkoxysilanes are used, or alternatively arylalkoxy silanes or vinyltrimethoxysilane or vinyltriethoxysilane may be added.

In some embodiments, the non-reactive wetting silanated agent may include, but are not limited to, methyl-silanes, linear alkyl-silanes, and aromatic silanes. In other embodiments, non-reactive wetting silanated agents include methyltrimethoxysilane and octyltrimethoxysilane. In still other embodiments, the non-reactive wetting silanated agents include phenyltrimethoxysilane.

In certain embodiments, reactive coupling agent include, but are not limited to, amino functional silanes, vinyl functional silanes, and epoxy functional silanes. In some embodiments, the reactive coupling agents include vinyltrimethoxysilane, 3-aminopropyltrimethoxysilane, (3-glycidoxypropyl)trimethoxysilane, γ-glycidoxyropyltrimethoxysilane, γ-glycidoxypropyldiethoxysilane, β-(3,4-epoxycyclohexyl)ethyltrimethoxysilane, γ-anilinopropyltrimethoxysilane, γ-(2-aminoethyl)aminopropyltrimethoxysilane, and γ-methacryloxypropyltrimethoxysilane. In further embodiments, the reactive coupling agents include 1-propane-amine,3-(triethoxysilyl).

Certain embodiments of the present invention are directed to a method of improving mechanical properties, reduce density, or improve surface appearance (i.e. scratch resistance) of a plastic or resin comprising of EMVG, c-EMVG or a combination thereof with other materials (such as glass fibers, synthetic fibers, mica or wollastonite) to the plastic or resin.

In some embodiments, the plastic or resin includes, but is not limited to acrylonitrile butadiene styrene (ABS), styrene acrylonitrile (SAN), acrylate styrene acrylonitrile (ASA), methacrylate butadiene styrene (MBS), polymers of formaldehyde, known as acetals; polymers of methyl methacrylate, known as acrylic plastics; polymers of monomelic styrene, known as polystyrenes; polymers of fluorinated monomers, known as fluorocarbons; polymers of amide chains, known as nylons; polymers of paraffins and olefins, known as polyethylenes, polypropylenes, and polyolefins; polymers composed of repeating bisphenol and carbonate groups, known as polycarbonates; polymers of terephthalates, known as polyesters; polymers of bisphenol and dicarboxylic acids, known as polyarylates; and polymers of vinyl chlorides, known as polyvinyl chlorides (PVC), polyphenylene sulfide (PPS), which has exceptionally high strength and rigidity; polyether ketone (PEK), polyether ether ketone (PEEK), polyamide imide (PAI); and polyetherimide (PEI), In some embodiments the, the plastic or resin includes polyolefins or engineering alloys. In another embodiment, the plastic or resin includes engineering alloys. In other embodiments, the plastic or resin is nylon 6, nylon 66, polypropylene, PC/ABS, PET/PBT, LCP, PC/ABS, LCP PET/PBT, or PPE-PA. In still further embodiments, the plastic or resin is nylon 6 or polypropylene. In certain embodiments, the plastic is polyolefin. In a further embodiment, the polyolefin is polypropylene.

In certain embodiments, the loading level of EMVG and/or c-EMVG in the polyolefin plastics is higher than 1 w/w %, in other embodiments, it is higher than 5 w/w %, and in a further embodiment, it is higher than 10 w/w %. In yet another embodiment, the loading level of EMVG can be added in the range up to 50 w/w %. In a further embodiment, the loading level of EMVG can be added in the range of 5-60 w/w %. In certain embodiments, the loading level is approximately 10-20 w/w %, and in other embodiments, the loading level is approximately 35-40 w/w %.

In certain embodiments, EMVG and/or c-EMVG can be used as supplementary reinforcing filler in the engineering alloys or other reinforced plastic compound. In other embodiments, EMVG and/or c-EMVG can be used to replace glass fibers partially or totally in plastics or resins. In certain embodiments, the substitution rate of glass fibers (GF) can be higher than or equal to 2% of the GF loading level (the weight ratio of EMVG and/or c-EMVG to glass fibers is no less than 1:19, for example, for reinforcing filler loading at 40% w/w, the EMVG or c-EMVG addition would be above or equal to 2% w/w). In other embodiments, the substitutions rate can be higher than or equal to 60% (the weight ratio of EMVG and/or c-EMVG to glass fibers is no less than 3:2, for example, for reinforcing filler loading at 40% w/w, the EMVG or c-EMVG addition would be above or equal to 24% w/w) and in further embodiments, the substitution rate can be higher than or equal to 70% (the weight ratio of EMVG and/or c-EMVG to glass fibers is no less than 7:3, for example, for reinforcing filler loading at 40% w/w, the EMVG or c-EMVG addition would be above or equal to 28% w/w).

In certain embodiments, the plastic is an engineering alloy. In a further embodiment, the engineering alloy is nylon. In certain embodiments, the method further comprising applying glass fibers to the plastic. In a further embodiment, the plastic is an engineering alloy. In a further embodiment, the engineering alloy is nylon. In certain embodiments, the method further comprising applying a micronized wollastonite to the plastic.

In certain embodiments, a functional filler mixture consisting of a EMVG or c-EMVG, or pumicite or pitchstone, and a micronized fibrous mineral like wollastonite can be used either in polyolefins (e.g., polypropylene), or in engineering alloys (e.g., nylon compounds) or any polymeric compound where high levels of flexural strength, tensile strength and impact strength are required by the compounders. Improved properties obtained are excellent creep and tortional sheer properties, high stiffness and HDT, low density, good balance of impact and stiffness, thin walled composites, surface appearance, mar/scratch resistance, comparable shrinkage with existing tooling, and reduced warpage. The mixture can be added in the range of 5-60% w/w:
either as single reinforcing filler (e.g., substituting 1:1 talc or surface treated calcined kaolin); or as a reinforcing filler partially or completely substituting glass fibers.

In certain embodiments, two combined chemical compounds, e.g., one acting as wetting agent and the other acting as functional coupling substance, can be used for the surface modification of the EMVG functional fillers for polyolefins and engineering alloys. Another aspect of the present invention is directed to a method of controlling odor in plastic comprising applying EMVG, c-EMVG or a combination thereof to the plastic. In certain embodiments, the plastic is polyolefin. In a further embodiment, the polyolefin is polypropylene.

Another aspect of the present invention is directed to a method of improving corrosion resistance of powder coating comprising applying EMVG to the powder coating.

EXAMPLES

Materials and Methods

Compounding Equipment

In certain embodiments, compounding mixes for EMVG and c-EMVG have been performed using twin screw extruder that is equipped with a downstream side feeder. In some embodiments, the EMVG and c-EMVG can be introduced at the powder or downstream feeder. Introducing the EMVG and c-EMVG downstream can be done to minimize the particle breakage during compounding to obtain the maximum strength properties in the compound. In additional embodiments, single screw extruder, and batch type mixers have been tested like Banbury Mixer of Farrel Corporation (Ansonia, Conn., USA).

Odor Control

In certain embodiments, composites of polypropylene with talc and composites of polypropylene with EMVG were tested for odor emission according to the method "Determination of the odor characteristics of trim materials in motor vehicles"—VDA 270, in a climate chamber for 2 hours at 80° C.

Anticorrosive Powder Coatings

Moreover, in other embodiments, EMVG was evaluated as a functional filler in anticorrosive powder coating formulas of epoxy coating systems and was evaluated against physical performance properties (impact resistance, hardness), appearance (gloss, smoothness) and corrosion resistance (ASTM B-117 Salt Fog).

EMVG and c-EMVG for Polyolefins

Polyolefin (e.g., polypropylene) plastic compounds can be non-reinforced ("neat") or reinforced with a mineral additive such as talc, mica, synthetic fibers (magnesium oxysulfate) and wollastonite. When some minerals, such as talc, are used an odor can be detected when the compounded is heated. This odor is undesirable for certain applications such as the interior of automobiles.

According to the disclosure herein, untreated (EMVG) and surface treated (c-EMVG) lamellar, high aspect ratio amorphous alumino-silicates give better or similar physical properties compared to 10 micron talc while they also have significantly less offensive odor emission when the compound is heated.

The c-EMVG was surface treated with the agents and percentages noted in each example but any type of the surface treatment agents described herein can be applied for c-EMVG to meet the specific application or processing requirements for polyolefins. The EMVG filler was surface treated in the industrial scale reactor previously described (see, e.g., FIG. 6a) and the plastic compounds were manufactured in an industrial extruder. The properties of the produced specimens were further evaluated in the laboratory. The coating process can be done using any of the surface treatment methods described in this patent and the amount of surface treatment agent applied can also be adjusted.

The 10 micron talc used is produced by Imifabi (Benwood, W. Va. USA) having a $d_{50}$ of 8.5 micron and Y-whiteness of 87.5. The 2 micron talc used is produced by Imifabi having a $d_{50}$ of 2 micron and Y-Brightness of 92. The 0.5 micron talc used is produced by Imifabi having a $d_{50}$ of 0.65 micron and a Y-Brightness of 93. The Mica1 used is produced by Xinfa (Hebei, China) having a $d_{50}$ of 12 microns and a Y whiteness of approximately 75. The Mica2 used is SG-75 muscovite mineral produced by Georgia Minerals (Sandersville, Ga. USA) having a $d_{50}$ of 17 microns and color (L value) of >88. The synthetic fiber is magnesium oxysulfate produced by Milliken & Company (Spartanburg, S.C. USA) having a fiber length of 10-30 micron and a fiber diameter of 0.5-1.2 micron. The HAR wollastonite used is NYGLOS 4W produced by NYCO Minerals (Willsboro, N.Y. USA) having a $d_{50}$ of 7 microns and a GE Brightness of 92.

For the examples 1 and 2 given below, the PP resin supplied by Advanced Composites (Sidney, Ohio USA) was 1:1 blend of prime homopolymer PP, MFR=30.0-40.0 g/10 min and prime homopolymer PP, MFR 2.5-5.5 g/10 min. Compounding was done using a Coperion (Ramsey, N.J. USA) ZSK26 twin extruder (26 mm). In examples 3 to 6 a high impact copolymer PP 20 MFR Braskem T16200Q (Braskem, Sao Paulo, Brazil) was used. The 10 micron talc, EMVG and c-EMVGs were added into the extruder at the powder feeder.

Certain of the materials described were used for Examples 1-6.

Example 1

In a mineral reinforced prime homopolymer PP formulation at 40% mineral loading, the EMVG gave improved tensile elongation at break compared to 10 micron talc. All other strength properties using the EMVG or 10 micron talc were similar. The use of EMVG provides a significant reduction in part density versus talc. See Example 2.

TABLE 1

Test results of mineral reinforced PP formulations

| Test Description | Units | Test Method | Neat PP | 10μ Talc | EMVG |
|---|---|---|---|---|---|
| Melt Flow Rate, 230 C/2.16 Kg | MPa | ISO 1133 | 9.3 | 8.0 | 3.4 |
| Filler Content | % | ISO 3451 | 0.0 | 39.1 | 40.6 |
| Tensile Strength, 50 mm/min | MPa | ISO 527 | 35.8 | 34.0 | 27.0 |
| Tensile Elongation at Break, 50 mm/min | % | ISO 527 | 39.0 | 4.3 | 7.7 |
| Flexural Modulus Chord, 2 mm/min | MPa | ISO 178 | 1460 | 4320 | 4120 |
| Flexural Strength, 2 mm/min | MPa | ISO 178 | 42.7 | 52.1 | 45.6 |
| Notched Charpy Impact at 23° C. | KJ/m$^2$ | ISO 179 | 2.2 | 1.9 | 1.4 |
| HDT @ 1.8 MPa | ° C. | ISO 75 | 58 | 88 | 85 |
| Density | g/cm$^3$ | ISO 1183 | 0.92 | 1.28 | 1.22 |
| Mold Linear Shrinkage, 4 × 8" plaque | % | APNA | 1.8 | 1.7 | 1.6 |
| Mold Transverse Shrinkage, 4 × 8" plaque | % | APNA | 2.0 | 1.7 | 1.8 |
| Ford Scratch Testing at 5 Newtons | | APNA | 3 | 2 | 4 |
| Ford Scratch Testing at 10 Newtons | | APNA | 3 | 3 | 5 |
| Ford Scratch Testing at 15 Newtons | | APNA | 4 | 3 | 5 |
| Ford Scratch Testing at 20 Newtons | | APNA | 4 | 4 | 5 |
| −30 C Notched Charpy | kJ/m$^2$ | ISO 179 | 1.5 | 1.4 | 1.3 |

Example 2

To determine the odor characteristic of the mineral filled prime homopolymer PP compounds discussed in Example 1, testing was done according to VDA 270 "Determination of the odor characteristics of trim materials in motor vehicles". Accordingly, samples were heated in a climate chamber for 2 hours at 80° C. and the emitted odor for each sample was evaluated by 4 different people using a numeric evaluation scale (1-6).

Grade 1=Not perceptible
Grade 2=Perceptible, but not disturbing
Grade 3=Clearly perceptible, but not disturbing
Grade 4=Disturbing
Grade 5=Strongly disturbing
Grade 6=Not acceptable The EMVG containing PP compound was found to have a perceptible but not disturbing odor while the 10 micron talc containing PP compound was found to have a strongly disturbing odor. See Table 2 for specific data.

TABLE 2

Odor characteristics of mineral reinforced PP formulations

| | Neat PP resin | PP resin with 10 micron talc | PP resin with EMVG |
|---|---|---|---|
| Tester 1 | 2 | 5 | 2 |
| Tester 2 | 1.5 | 5 | 2 |
| Tester 3 | 1 | 6 | 2 |
| Average | 1.5 | 5.33 | 2.0 |
| Final Grade | 1.5 | 5.5 | 2.0 |

Example 3

In a mineral reinforced high impact copolymer PP 20 MFR Braskem T16200Q (Braskem, Sao Paulo, Brazil) formulation at 15% mineral loading, the addition of c-EMVG surface treated with a 2% solids emulsion of organomodified polysiloxane gave highly improved tensile elongation whereas stiffness and tensile strength were comparable to the 2 microns talc. Density of the new engineering plastic is reduced but also impact properties are inferior to both 0.5 and 2 microns products. See Table 3 for specific data.

TABLE 3

Test results of mineral reinforced PP formulations with c-EMVG
(c = organomodified polysiloxane)

| Test Method | Conditions | Units | Neat PP | 0.5 um Talc | 2 um Talc | c-EMVG |
|---|---|---|---|---|---|---|
| Melt Flow Rate ISO 1133 | 230° C./2.16 kg | g/10 mins | 20 | 14 | 13 | 12 |
| Filler Content ISO 3451 | 1500° F./10 mins | % | 0 | 15 | 14 | 16 |
| Moisture ASTM D6980 | 1500 C | % | 0.004 | 0.005 | 0.004 | 0.001 |
| Density ISO 1183 | | g/cm3 | 0.90 | 1.01 | 1.00 | 0.99 |
| Tensile Strength ISO 527 | 50 mm/min-CH | MPa | 17 | 19 | 18 | 16 |
| Tensile Elongation ISO 527 | 50 mm/min-CH | % | 331 | 114 | 112 | 330 |
| Flex Strength ISO 178 | 2 mm/min | MPa | 19 | 26 | 24 | 22 |
| Flex Modulus Chord | | MPa | 663 | 1664 | 1207 | 1110 |
| Charpy Notched, 23° C. | | kJ/m2 | 54 | 43 | 33 | 16 |
| Charpy Notched, −30° C. | | kJ/m2 | 6.0 | 4.1 | 3.9 | 3.3 |

Example 4

In a mineral reinforced high impact copolymer PP 20 MFR Braskem T16200Q (Braskem, Sao Paulo, Brazil) formulation at 15% mineral loading, the combination of c-EMVG and Synthetic fibers (magnesium oxysulfate supplied by Milliken) with two ratios of c-EMVG/Fibers (ratio 1=60:40, ratio 2=80:20) applied gave improved stiffness properties and improved (lighter) density, compared to Imifabi 0.5 micron and 2 micron talc (depending on the ratio). Where c corresponds to "coated" with 2% solids emulsion of organomodified polysiloxane. All other properties using the c-EMVG and synthetic fibers combinations compared to 0.5 talc and 2 microns were similar. See Table 4 for specific data.

TABLE 4

Test results of mineral reinforced PP formulations with c-EMVG +
Synthetic fibers (c = organomodified polysiloxane)

| Test Method | Conditions | Units | Neat PP | 0.5 microns talc | 2 microns talc | C-EMVG + Synthetic Fibers1 | C-EMVG + Synthetic Fibers2 |
|---|---|---|---|---|---|---|---|
| Melt Flow ISO 1133 | 230° C./ 2.16 kg | g/10 mins | 20 | 14 | 13 | 13 | 12 |
| Filler content ISO 3451 | 1500° F./ 10 mins | % | 0 | 15 | 14 | 16 | 15 |
| Moisture ASTM D6980 | 1500 C. | % | 0.004 | 0.005 | 0.004 | 0.001 | 0.001 |
| Density ISO 1183 | | g/cm3 | 0.90 | 1.01 | 1.00 | 0.99 | 1.00 |
| Tensile strength ISO 527 | 50 mm/min - CH | MPa | 17 | 19 | 18 | 17 | 16 |
| Tensile Elongation ISO 527 | 50 mm/min - CH | % | 331 | 114 | 112 | 110 | 75.0 |
| Flex strength ISO 178 | 2 mm/min | MPa | 19 | 26 | 24 | 24 | 24 |
| Flex Modulus Chord ISO 178 | 2 mm/min | MPa | 663 | 1664 | 1207 | 1670 | 1490 |
| Charpy Notched, 23° C. ISO 179 | | kJ/m2 | 54 | 43 | 33 | 24 | 26 |
| Charpy Notched, −30° C. ISO 179 | | kJ/m2 | 6.0 | 4.1 | 3.9 | 3.2 | 2.8 |

Example 5

In a mineral reinforced high impact copolymer PP 20 MFR Braskem T16200Q (Braskem, Sao Paulo, Brazil) formulation at 15% mineral loading, the combination of c-EMVG, where the coating is organomodified polysiloxane at 2% solids emulsion addition, and short High Aspect Ratio NYGLOS 4W wollastonite fibers applied gave improved stiffness properties compared to Imifabi 2 micron talc. The c-EMVG and c-HAR wollastonite is a blend ratio of 80:20. All other properties using the combination c-EMVG and HAR wollastonite to Imifabi 0.5 and 2 microns talc were similar. See Table 5 for specific data.

TABLE 5

Test results of mineral reinforced PP formulations with c-EMVG +
c-HAR Wollastonite (c = organomodified polysiloxane)

| Test Method | Conditions | Units | Neat PP | 0.5 microns talc | 2 microns talc | C-EMVG + c-HAR Wollastonite |
|---|---|---|---|---|---|---|
| Melt Flow Rate ISO 1133 | 230° C./ 2.16 kg | g/10 mins | 20 | 14 | 13 | 12 |
| Filler content ISO 3451 | 1500° F./ 10 mins | % | 0 | 15 | 14 | 15 |
| Moisture ASTM D6980 | 1500 C. | % | 0.004 | 0.005 | 0.004 | 0.001 |
| Density ISO 1183 | | g/cm3 | 0.90 | 1.01 | 1.00 | 0.99 |
| Tensile Strength ISO 527 | 50 mm/min - CH | MPa | 17 | 19 | 18 | 16 |
| Tensile Elongation ISO 527 | 50 mm/min - CH | % | 331 | 114 | 112 | 140 |
| Flex Strength ISO 178 | 2 mm/min | MPa | 19 | 26 | 24 | 22 |
| Flex Modulus Chord ISO 178 | 2 mm/min | MPa | 663 | 1664 | 1207 | 1240 |
| Charpy Notched, 23° C. ISO 179 | | kJ/m2 | 54 | 43 | 33 | 29 |
| Charpy Notched, −30° C. ISO 179 | | kJ/m2 | 6.0 | 4.1 | 3.9 | 3.6 |

Example 6

In a mineral reinforced high impact copolymer PP 20 MFR Braskem T16200Q (Braskem, Sao Paulo, Brazil) formulation at 15% mineral loading, the combination of c-EMVG and surface coated Mica from two origins were tested (c-Mica1 using Xinfa mica, c-Mica2 using Georgia Minerals mica), where c is organomodified polysiloxane at 2% solids emulsion addition. In samples 1 and 2 of c-EMVG and mica is a blend ratio of 80:20. Data showed better stiffness compared to Imifabi 2 microns talc and better tensile elongation compared to both Imifabi 0.5 and 2 microns talc. All other properties using the combination c-EMVG and coated Mica1 and Mica2 against 0.5 and 2 microns talc were comparable. Also, the use of c-EMVG and mica results to a cost reduction of 10-20% versus talc. See Table 6 for specific data.

TABLE 6

Test results of mineral reinforced PP formulations c-EMVG + Mica1 or c-EMVG + Mica2 (c = organomodified polysiloxane)

| Test Method | Conditions | Units | Neat PP | 0.5 microns talc | 2 microns talc | c-EMVG + c-Mica1 | c-EMVG + c-Mica2 |
|---|---|---|---|---|---|---|---|
| Melt Flow Rate ISO 1133 | 230° C./ 2.16 kg | g/10 mins | 20 | 14 | 13 | 12 | 11 |
| Filler content ISO 3451 | 1500° F./ 10 mins | % | 0 | 15 | 14 | 16 | 15 |
| Moisture ASTM D6980 | 1500 C. | % | 0.004 | 0.005 | 0.004 | 0.001 | 0.001 |
| Density ISO 1183 | | g/cm3 | 0.90 | 1.01 | 1.00 | 0.99 | 1.00 |
| Tensile Strength ISO 527 | 50 mm/min - CH | MPa | 17 | 19 | 18 | 16 | 15 |
| Tensile Elongation ISO 527 | 50 mm/min - CH | % | 331 | 114 | 112 | 70 | 240.0 |
| Flex Strength ISO 178 | 2 mm/min | MPa | 19 | 26 | 24 | 18 | 22 |
| Flex Modulus Chord ISO 178 | 2 mm/min | MPa | 663 | 1664 | 1207 | 1190 | 1210 |
| Charpy Notched, 23° C. ISO 179 | | kJ/m2 | 54 | 43 | 33 | 24 | 21 |
| Charpy Notched, −30° C. ISO 179 | | kJ/m2 | 6.0 | 4.1 | 3.9 | 3.6 | 3.3 |

EMVG and c-EMVG for Engineering Alloys and Blends

Nylon plastic compounds typically are reinforced using a mineral additive such as calcined clay, talc, mica, and wollastonite by itself or as a glass/mineral blend. However, the highest mechanical reinforcement of engineering alloys is achieved through loading of 25-40% w/w glass fibers where nylon compounds are produced through extrusion.

In certain embodiments of the present disclosure, milled and untreated lamellar aluminosilicate (EMVG) and milled and surface treated lamellar aluminosilicate (c-EMVG) were each tested in a formulation in mineral and glass/mineral PA6 formulations. EMVG was surface treated with the two different coating techniques: c-EMVG/a was treated with the industrial-scale equipment shown in FIG. 6a and c-EMVG/b was surface treated in the lab-scale device shown in FIG. 6b, using the corresponding techniques described above. The plastic compounds were manufactured in an industrial extruder. The properties of the produced specimens were further evaluated in the laboratory.

Figure 8:
FIG. 8 shows a SEM image of an embodiment comprising PA reinforced with c-EMVG/glass fibers.

It has been shown that in certain embodiments, untreated (EMVG) and surface treated (c-EMVG) lamellar, high aspect ratio amorphous aluminosilicates meet the requirements of straight mineral filled and glass/mineral reinforced nylon compounds. The results obtained using EMVG and c-EMVG makes them a viable choice as mineral additives in engineering plastics, alloys and blends for the substitution of other fillers or the partial or total substitution of glass fibers. In FIG. 8, a micrograph of c-EMVG/b/glass fibers reinforced nylon compound is presented. The uniform dispersion and the adhesion of c-EMVG in the polymer matrix can be seen, in consistency to the physical properties results.

The c-EMVG was surface treated with the agents and percentages described in each example but any type of the surface treatment agents described in this patent can be applied to c-EMVG to meet the specific application or processing requirements for engineering plastics, alloys and blends. The coating process can be done using any of the surface treatment methods described in this patent and the amount of surface treatment agent applied can also be adjusted.

The calcined kaolin used is Translink 445, which is an amino silane surface treated kaolin supplied by BASF (Florham Park, N.J. USA) having a $D_{50}$ of 1.4 microns and GE Brightness of 90. The 10 micron talc used is produced by Imifabi having a $d_{50}$ of 8.5 micron and Y-whiteness of 88. The glass used is HP3610 produced by PPG Fiber Glass (Shelby, N.C. USA) is chopped glass fiber having a median diameter of 10 microns.

For the examples given below, the PA6 compounds (Aegis® H8202NLB supplied by Prospector/Honeywell (Morristown, N.J. USA) having a Viscosity-FAV=46-52 and Melt Mass Flow Rate=9.8 g/10 min.) were made using a Coperion ZSK26 twin extruder (26 mm). The EMVG, c-EMVGs, and calcined kaolin were added into the extruder at the powder feeder and the chopped glass was added into the extruder at the glass feeder.

Certain of these materials are used for Examples 7-10, below.

Example 7

In a straight mineral filled PA 6 formation (20% mineral loading), uncoated EMVG (38%) as well as coated c-EMVGs with the two different methods (c-EMVG/a and c-EMVG/b) were found to give physical properties which exceed or are similar to the properties obtained when calcined kaolin or no filler was used in specific nylon compounds. It should be noted that the shrinkage property is either comparable or lower. The C-EMVG/a was surface treated with 0.5 wt % coating of 3-aminopropyltrimethoxysilane and c-EMVG/b was surface treated with 0.5 wt % coating of a mixture of dimethyl siloxane, dimethylvinyl-terminated and dimethyl, methylhydrogen siloxane. With the properties obtained, the EMVG and c-EMVG series could be considered a reliable and cost effective reinforcing/functional filler for PA compounds. The use of c-EMVG series results to a cost reduction of 20-30% versus kaolin. See Table 7 for specific data.

TABLE 7

Test results of straight mineral filled PA formulations

| Test Description | Units | Test Method | PA 6 unfilled | Calcined Kaolin | EMVG | c-EMVG/a | c-EMVG/b |
|---|---|---|---|---|---|---|---|
| Filler Content | % | ISO 3451 | 0.0 | 21.7 | 38.4 | 20.0 | 21.8 |
| Tensile Strength, 50 mm/min | MPa | ISO 527 | 78 | 87 | 94 | 94.5 | 82 |
| Tensile Elongation at Break, 50 mm/min | % | ISO 527 | 25 | 18 | 2.9 | 15.0 | 5.3 |
| Flexural Modulus Chord, 2 mm/min | MPa | ISO 178 | 2400 | 3650 | 5823 | 3980.0 | 3950 |
| Flexural Strength, 2 mm/min | MPa | ISO 178 | 85 | 125 | 133 | 131.0 | 116 |
| Notched Charpy Impact at 23° C. | KJ/m$^2$ | ISO 179 | 3.5 | 4.2 | 2.5 | 6.2 | 3.0 |
| Unnotched Charpy Impact at 23° C. | KJ/m$^2$ | ISO 179 | No break | 150 | 36 | 110.0 | 46 |
| HDT A 1.8 MPa | ° C. | ISO 75 | 60 | 68 | 132 | 88.0 | 81 |
| Density | g/cm$^3$ | ISO 1183 | 1.13 | 1.30 | 1.4 | 1.3 | 1.28 |
| Mold Linear Shrinkage, 4 × 8" plaque | % | APNA | — | 1.5 | 0.8 | 1.3 | 1.3 |
| Mold Transverse Shrinkage, 4 × 8" plaque | % | APNA | — | 1.4 | 1.0 | 1.5 | 1.4 |

Example 8

In glass/mineral reinforced PA/nylon formulations at 40% loading level (15% PPG chopped glass fiber, 25% mineral) or 50% loading level (20% PPG chopped glass fiber, 30% mineral), the uncoated EMVG as well as coated c-EMVGs (C-EMVGa=surface treated 0.5 wt % with 3-aminopropyltrimethoxysilane and EMVGb=surface treated with 0.5 wt % coating of a mixture of dimethyl siloxane, dimethylvinyl-terminated and dimethyl, methylhydrogen siloxane) with the two different surface treatment methods (c-EMVG/a and c-EMVG/b) were found to give physical properties which exceed or are similar to the properties obtained when calcined kaolin Translink 445 is used in specific Nylon compounds. It should be noted that the shrinkage property is either comparable or lower. Therefore, EMVG and c-EMVG series could be considered a reliable and cost effective reinforcing/functional filler for PA compounds with cost reduction of 10-60% versus calcined clay and or partial replacement of chopped glass. See Table 8 for specific data.

TABLE 8

Test results of glass/mineral reinforced PA formulations
(c = 0.5 wt % 3-aminopropyltriethoxysilane)

| Test Description | Units | Test Method | Glass/Calcined Kaolin | Glass/EMVG | Glass/c-EMVG/a | Glass/c-EMVG/b |
|---|---|---|---|---|---|---|
| Filler Content | % | ISO 3451 | 41.3 | 50.9 | 41.3 | 41.6 |
| Tensile Strength, 50 mm/min | MPa | ISO 527 | 136 | 123 | 160 | 119.0 |

TABLE 8-continued

Test results of glass/mineral reinforced PA formulations
(c = 0.5 wt % 3-aminopropyltriethoxysilane)

| Test Description | Units | Test Method | Glass/ Calcined Kaolin | Glass/ EMVG | Glass/c-EMVG/a | Glass/c-EMVG/b |
|---|---|---|---|---|---|---|
| Tensile Elongation at Break, 50 mm/min | % | ISO 527 | 4.7 | 2.9 | 5.4 | 2.2 |
| Flexural Modulus Chord, 2 mm/min | MPa | ISO 178 | 6950 | 9190 | 7790 | 7970.0 |
| Flexural Strength, 2 mm/min | MPa | ISO 178 | 200 | 173 | 222 | 166.0 |
| Notched Charpy Impact at 23° C. | KJ/m$^2$ | ISO 179 | 5.2 | 4.4 | 6.3 | 4.6 |
| Unnotched Charpy Impact at 23° C. | KJ/m$^2$ | ISO 179 | 49 | 39 | 63 | 36.9 |
| HDT A 1.8 MPa | ° C. | ISO 75 | 191 | 198 | 198 | 196.0 |
| Density | g/cm$^3$ | ISO 1183 | 1.49 | 1.5 | 1.46 | 1.47 |
| Mold Linear Shrinkage, 4 × 8" plaque | % | APNA | 0.5 | 0.5 | 0.5 | 0.5 |
| Mold Transverse Shrinkage, 4 × 8" plaque | % | APNA | 1.0 | 0.8 | 1.0 | 1.2 |

Example 9

In glass/mineral reinforced PA/nylon formulations at 40% loading level (15% chopped glass fiber, 25% minerals), the c-EMVG (1 wt % surface treated with 3-(2-aminoethylamino)propyltrimentoxysilane) showed all mechanical properties superior compared to surface treated calcined kaolin and in addition density was better (lighter) compared to surface treated calcined kaolin. When the comparison is to 10 microns talc, only stiffness (flexular modulus) has lower values and all other mechanical properties show improvement. Density again is lower than 10 microns talc in the specific Nylon compound. All the previous data with c-EMVG promote it as a partial replacement of expensive chopped glass in an all glass formulation as well as for the total replacement of the calcined clay+a percentage of the chopped glass in glass/mineral compounds. This approach regardless of formulation justifies the use of c-EMVG to lower raw material cost by 10-60% versus calcined clay and or partial replacement of chopped glass, reduce composites density and reduce glass/read out without loss of physical properties. The reduction of glass read out (poor surface finish) can have an additional improvement in vibration/noise reduction for the specific part application. See Table 9 for specific data.

TABLE 9

Test results of glass/mineral reinforced PA formulations with c-EMVG (c = 3-(2-aminoethylamino)propyltrimethoxysilane)

| Test Description | Units | Standard | Glass/ Calcined clay | Glass/ c-EMVG | Glass/10 microns talc |
|---|---|---|---|---|---|
| Filler Content | % | ISO 3451 | 41.3 | 39.6 | 36.5 |
| Tensile Strength, 50 mm/min | MPa | ISO 527 | 136 | 155 | 133 |
| Tensile Elongation at Break, 50 mm/min | % | ISO 527 | 4.7 | 5.5 | 4.1 |
| Flexural Modulus Chord, 2 mm/min | MPa | ISO 178 | 6950 | 7780 | 10500 |
| Flexural Strength, 2 mm/min | MPa | ISO 178 | 200 | 222 | 197 |
| Notched Charpy Impact at 23° C. | KJ/m$^2$ | ISO 179 | 5.2 | 5.6 | 5.4 |
| Unnotched Charpy Impact at 23° C. | KJ/m$^2$ | ISO 179 | 49 | 61 | 47 |
| Density | g/cm$^3$ | ISO 1183 | 1.49 | 1.44 | 1.47 |

Example 10

In glass/mineral reinforced PA/nylon formulations at 40% loading level (15% chopped glass fiber, 25% minerals), the c-EMVGa (1 wt % surface treatment of phenytrimethoxysilane) and c-EMVGb (1 wt % surface treatment of a bi-functional silane containing 3-aminopropypltrimethoxysilane and polyethyleneglycol-functioning alkoxysilane) showed considerable reduction in density of the Nylon compounds when compared with surface treated calcined kaolin and better flexural modulus (better stiffness) but minor loss of impact. When compared to 10 microns talc again density of the compound is lower and stiffness comparable but other properties are lower. All data support the testing of c-EMVG for the partial replacement of chopped glass in an all glass formulations which range in percent loadings dependent on the application from 15 to 33% with the high loading of 33% typically employed for air intake manifolds. All glass air intake manifolds create noise and vibration where market development is underway to replace some of the glass compounded in air intake manifolds to reduce the noise and vibration with the root cause "glass read out/surface appearance". The same c-EMVG works also as glass fiber replacement in an all glass PA formulation to reduce cost, weight & warpage without loss of stiffness & HDT. The cost reduction that can be achieved is 10-60% versus calcined clay and or partial replacement of chopped glass. See Table 10 for specific data.

TABLE 10

Test results of glass/mineral reinforced PA formulations
with c-EMVG (c = phenyltrimethoxysilane)

| Test Description | Units | Test Method | Glass/ Calcined Kaolin | Glass/ c-EMVGa | Glass/ c-EMVGb | Glass/10 microns talc |
|---|---|---|---|---|---|---|
| Filler Content | % | ISO 3451 | 41.3 | 40.2 | 37.7 | 36.5 |
| Tensile Strength, 50 mm/min | MPa | ISO 527 | 136 | 139 | 144 | 133 |
| Tensile Elongation at Break, 50 mm/min | % | ISO 527 | 4.7 | 3.1 | 4.9 | 4.1 |
| Flexural Modulus Chord, 2 mm/min | MPa | ISO 178 | 6950 | 9620 | 7520 | 10500 |
| Flexural Strength, 2 mm/min | MPa | ISO 178 | 200 | 170 | 200 | 197 |
| Notched Charpy Impact at 23° C. | KJ/m$^2$ | ISO 179 | 5.2 | 3.1 | 5.3 | 5.4 |
| Unnotched Charpy Impact at 23° C. | KJ/m$^2$ | ISO 179 | 49 | 28 | 50 | 47 |
| Density | g/cm$^3$ | ISO 1183 | 1.49 | 1.41 | 1.43 | 1.47 |

Anticorrosive Powder Coatings

In this example, EMVG was evaluated as functional filler for fundamental performance in anticorrosive powder coating formulations. EMVG was added in epoxy powder coatings at a concentration of 13.7% by volume or 23% by weight. It was compared against a zinc rich formulation with 80% by weight of zinc dust. The zinc dust used was supplied the US Zinc Company (Houston, Tex. USA) with product code US Z#1 with average particle size of 5-8 microns and specific gravity of 7.1.

These technologies are very commonly used for functional applications requiring high levels of corrosion resistance and chemical resistance. No colorant pigmentation was used so the effect on corrosion resistance would be easily observed without interactions of other formulation components. Formulas with no filler content were also evaluated as controls.

The formulation materials used for Epoxy-DICY (dicyandiamide) were: Epoxy Resin: Kukdo Chemical (Seoul, Korea) KD-242G, DICY (dicyandiamide): Dyhard® 100M supplied by AlzChem (Trostberg, Germany), Flow Agent: DER 6330 A10 from Dow Chemical (Ringwood, Ill. USA). The materials for Epoxy-Phenolic were: Modified Epoxy Resin: KD-211H Phenolic Curing Agent from Kukdo Chemical (Seoul, Korea) KD-404 Flow Agent: Resiflow P-67 from Kukdo Chemical (Seoul, Korea) and a common raw material: Benzoin from ESTRON Chemical Inc (Calvert City, Ky. USA) as a degassing agent.

The processing conditions of the tests were: Premix: 8 seconds Vitamix blender (Cleveland, Ohio USA) at low setting Extrusion: APV (Baker Perkins Ltd, Peterborough, England) 19 mm twin screw extruder, Zone 1: 113° C., Zone 2: 83° C., Feed: 30, RPM: 500, Torque: Range from 20%-50% Chill Rolls: 22 rpm, Grind: Strand Mill, Sieve: 140 mesh (106 μm)

The coating parameters were: Application: Parker Ionics (Westland, Mich. USA) GFX 3500 Pulse Power manual gun system set at 100 Kv, Substrate: 3 inch×5 inch un-pretreated CRS (cold rolled steel) and 4 inch×6 inch FePO4 B-1000 CRS Film Thickness: 2.0-3.0 mils (51-76 microns), Bake: 10 minutes at 392° F. (200° C.) metal temperature Example 11

In general, the phenolic cured epoxy formulas exhibited higher gloss than their DICY cure counterparts. EMVG produced a significant gloss reduction in powder coatings (phenolic: 76 GU and DICY: 62 GU). Results are presented in Table 11.

The EMVG based powder coatings both exhibited superior hardness results compared to the material of control. The general trends include: DICY cured formulas are more flexible than phenolic cured samples. Both EMVG based powder coatings produced relatively good impact resistance (120 inch lbs. for phenolic cure and 160 inch lbs. for DICY cure). Results are presented in Table 11.

TABLE 11

Test results of epoxy formulations

| Components | Formulation (1) Epoxy-Dicy EMVG | | Formulation (3) Epoxy-Dicy No Fill | | Formulation (4) Epoxy-Phenolic EMVG | | Formulation (5) Epoxy-Phenolic No Fill | |
|---|---|---|---|---|---|---|---|---|
| Epoxy Resin | Kukdo KD242G | 339.5 | Kukdo KD242G | 441.3 | Kukdo 211H | 259.5 | Kukdo 211H | 338.3 |
| Modified Epoxy | DER 6330 A10 | 28.7 | DER 6330 A10 | 37.3 | | 0 | | 0 |
| Curing System | DICY Dyhard 100M | 14.5 | DICY Dyhard 100M | 18.9 | Phenolic Kukdo KD 404 | 118.2 | Phenolic Kukdo KD 404 | 154.2 |
| Flow Agent | | 0 | | 0 | Resiflow P-67 | 5.0 | Resiflow P-67 | 5.0 |

TABLE 11-continued

Test results of epoxy formulations

| Components | Formulation (1) Epoxy-Dicy EMVG | | Formulation (3) Epoxy-Dicy No Fill | | Formulation (4) Epoxy-Phenolic EMVG | | Formulation (5) Epoxy-Phenolic No Fill | |
|---|---|---|---|---|---|---|---|---|
| Degasser | Benzoin | 2.5 | Benzoin | 2.5 | Benzoin | 2.5 | Benzoin | 2.5 |
| EMVG | | 114.8 | | 0 | | 114.8 | | 0 |
| US Zinc (#1) | | 0 | | 0 | | 0 | | 0 |
| Total (gr) | | 500 | | 500 | | 500 | | 500 |
| Properties | | | | | | | | |
| Gloss 60° | | 62.0 | | 95.9 | | 76.0 | | 94.4 |
| Pencil Hardness | | 5H | | 3H | | 5H | | 4H |
| Impact Resistance (in-lbs) | | 160 | | 160 | | 120 | | 160 |

Minor differences were seen in scratch hardness as observed in pencil hardness test results. The absence of filler may reduce the scratch hardness as evidenced in the DICY cured powder without filler which exhibited a 3H pencil hardness versus EMVG powder samples exhibiting 4H to 5H hardness. The Pencil Hardness Scale is shown below (from softer to harder):

5B-4B-3B-2B-B-HB-F-H-2H-3H-4H-5H

Salt Fog corrosion resistance (according to ASTM B-117) was conducted with all powder coating formulas. Clean, untreated cold rolled steel (CRS) and B-1000 (FePO$_4$) CRS were used as the substrates. The non-phosphated CRS was expected to maximize differences and accelerate the corrosion process. The iron phosphate B-1000 CRS was used to determine long term corrosion performance. In Table 12 below, the mechanical and gloss properties of powder coatings in CRS containing either EMVG or zinc dust is shown. The improvement using EMVG compared to zinc dust is quite evident.

TABLE 12

Mechanical and Gloss properties in CRS

| | Formulation 1 Epoxy-Dicy EMVG | | Formulation 2 Epoxy-Dicy Zn Rich | |
|---|---|---|---|---|
| Epoxy Resin | Kukdo KD242G | 339.5 | Epon 2004 | 72.3 |
| Modified Epoxy | DER 6330 A10 | 28.7 | DER 6330 A10 | 6.1 |
| Curing System | DICY Dyhard 100M | 14.5 | DICY Dyhard 100M | 3.1 |
| Flow Agent | | 0 | | 0 |
| Degasser | Benzoin | 2.5 | Benzoin | 2.5 |
| EMVG | | 114.8 | | 0 |
| US Zinc (#1) | | 0 | | 336 |
| Total (gr) | | 500 | | 420 |
| Properties | | | | |
| Salt Fog Exposure (hrs) | | 1514 | | 586 |
| Gloss 60° | | 62 | | 8 |
| Hardness | | 5H | | 5H |
| Impact Resistance (in/lb) | | 160 | | 130 |
| Key to Sribe Rating (ASTM D1654) | | 8 | | 9 |
| Blister Rating (ASTM D714) | | 10 | | 10 |
| Rust Rating (ASTM D610) | | 10 | | 10 |

Figure 9A:
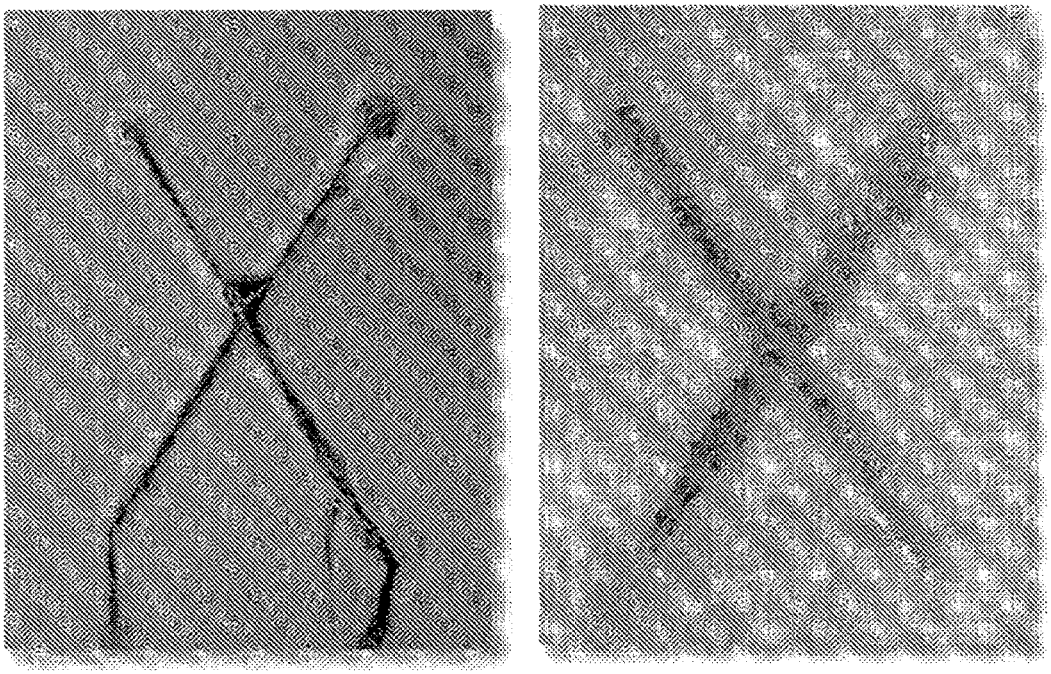
FIG. 9A shows an embodiment of salt fog exposure of cold rolled steel panels coated with an epoxy/DICY powder coating system. A panel covered with a powder coating with EMVG (image on left) failed at 2110 hours due to loss of adhesion, while a panel covered with a powder coating with only zinc dust (image on right) failed at 750 hours due to loss of adhesion and severe blistering.
Figure 9B:
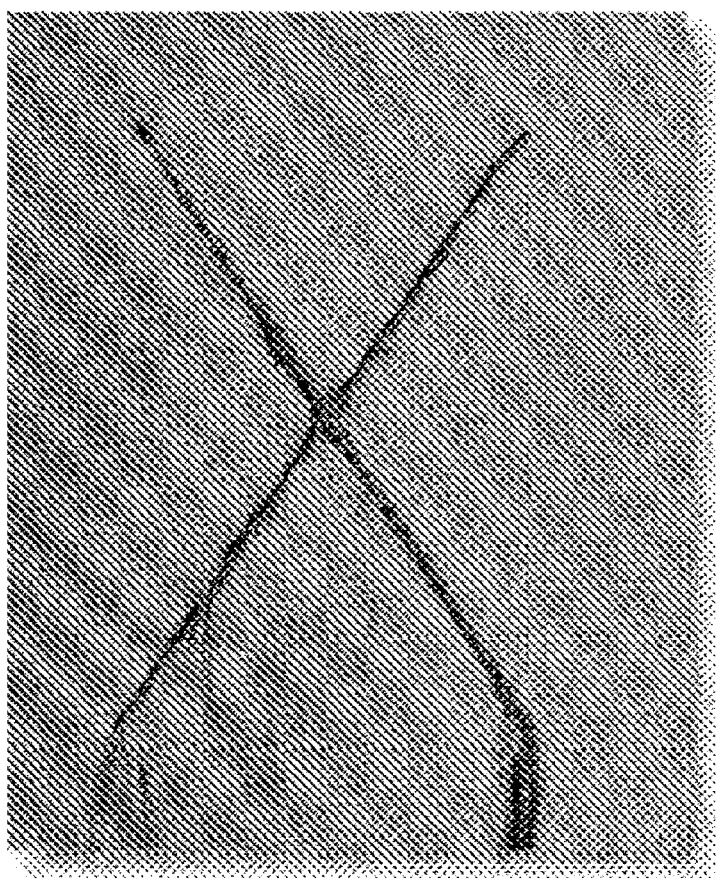
FIG. 9B shows an embodiment of salt fog exposure of cold rolled steel panels coated with an epoxy/DICY powder coating system. This figure shows a panel covered with a powder coating with EMVG (B1000—Epoxy/DICY system) at 3100 hours salt fog exposure.
Figure 10:
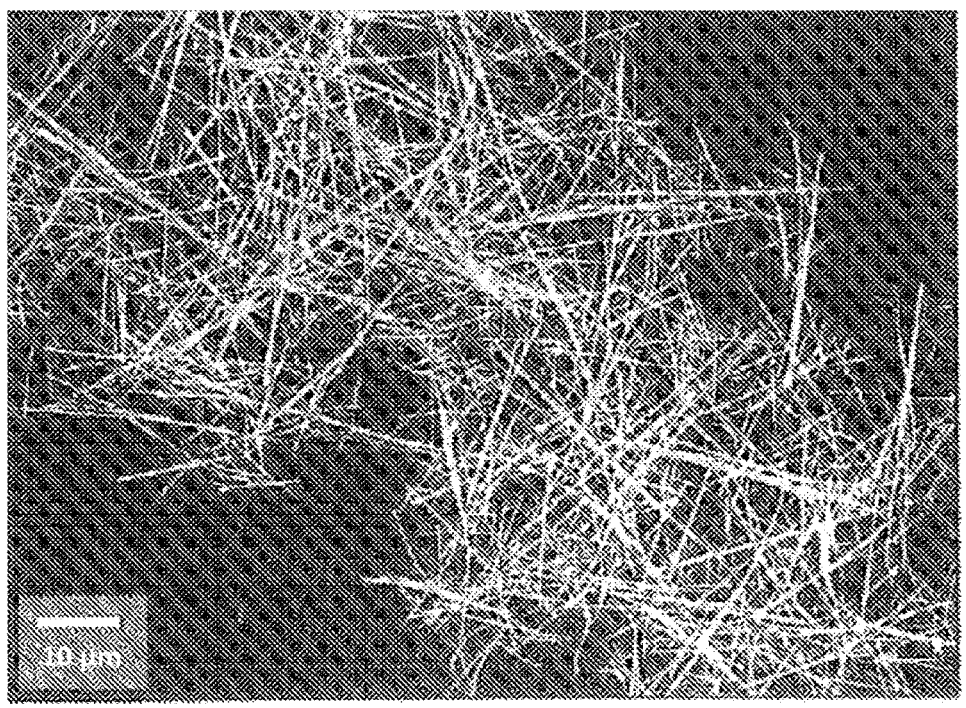
FIG. 10 shows a SEM image of magnesium oxysulfate fibers
Figure 11:
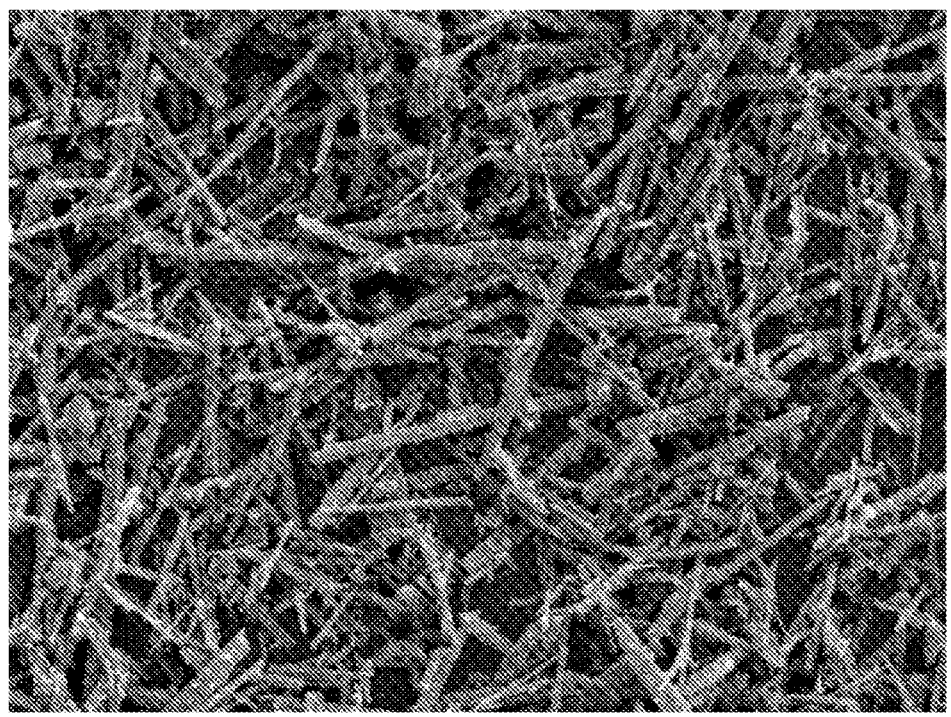
FIG. 11 shows a SEM image of wollastonite fibers

On CRS using an Epoxy/DICY based resin, the zinc filled formulation failed after 750 hrs of salt fog testing due to loss of adhesion and severe blistering. Whereas the EMVG filled formulation gave improved corrosion resistance, failing at 2110 of salt fog testing. See FIG. 9A. On B-1000 powder coating the EMVG surpassed 3100 hrs salt fog exposure. See FIG. 9B.

As shown in Example 12, Table 11 and Table 12, EMVG can be used as functional anticorrosive filler in epoxy and probably other powder coating systems such as epoxy polyester hybrid, urethane polyester and polyester (TGIC) systems. A reduction in gloss is observed Table 11 with EMVG to an unfilled system, however no adverse effects on mechanical or corrosion resistance were observed.

The lower specific gravity of EMVG compared to zinc dust offers a significant cost savings opportunity. Using a standard selling price of the $2.75/1b for the powder coating, the use of EMVG provides a range of 70-150% savings to the final customer cost based upon square footage use and 90-180% higher coverage ability of the powder coating.

The features and advantages of the present disclosure will be readily apparent to those skilled in the art. While numerous changes may be made by those skilled in the art, such changes are within the spirit of the invention.

We claim:

1. A powder coating composition comprising:
   micronized expanded volcanic glass filler (EMVG); and
   at least one chemical agent, wherein
   the at least one chemical agent is coated on the surface of the EMVG,
   the EMVG has a median particle size less than 10 μm, and
   the powder coating composition is between 0.25% and 4% by weight of EMVG.

2. The powder coating composition of claim 1, comprising at least two chemical agents coated on the surface of the EMVG.

3. The powder coating composition of claim 1, wherein the at least one chemical agent is selected from the group consisting of a polymer, a wax, an emulsion, an organo-based silane, and combinations of any thereof.

4. The powder coating composition of claim 1, wherein the EMVG is selected from the group consisting of a perlite, a pitchstone, a pumicite, and combinations of any thereof.

5. The powder coating composition of claim 1, wherein the EMVG contains less than 5% mineral impurities.

6. The powder coating composition of claim 5, wherein the EMVG is substantially free of mineral impurities.

7. The powder coating composition of claim 5, wherein the mineral impurities comprise an impurity selected from the group consisting of ferromagnetic matter, crystalline silica, cristobalite, mica, feldspars, and combinations of any thereof.

8. A powder coating composition comprising
   surface coated micronized expanded volcanic glass filler (c-EMVG) and
   a material selected from the group consisting of a polyolefin, an
   engineering plastic, and a coating, wherein
the c-EMVG has a median particle size less than 10 μm, and the composition is between 0.25% and 4% by weight of c-EMVG.

9. The powder coating composition of claim 8, wherein the polyolefin comprises polypropylene.

10. The powder coating composition of claim 8, wherein the engineering plastic is selected from the group consisting of nylon 6, nylon 66, PC/ABS, PET/PBT, LCP, PC/ABS, LCP PET/PBT, PPE-PA, and combinations of any thereof.

11. The powder coating composition of claim 8, wherein the coating comprises a powder coating.

12. The powder coating composition of claim 1, wherein the powder coating composition is an epoxy based powder coating composition.

13. The powder coating composition of claim 12, wherein the epoxy based powder composition comprises an epoxy phenolic or an epoxy-dicyandiamide (epoxy-D ICY).

14. The powder coating composition of claim 8, wherein the powder coating composition is an epoxy based powder coating composition.

15. The powder coating composition of claim 14 wherein the epoxy based powder composition comprises an epoxy phenolic or an epoxy-dicyandiamide (epoxy-D ICY).

\* \* \* \* \*